United States Patent
Takeda et al.

(10) Patent No.: US 10,841,946 B2
(45) Date of Patent: Nov. 17, 2020

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/755,908

(22) PCT Filed: Aug. 22, 2016

(86) PCT No.: PCT/JP2016/074390
§ 371 (c)(1),
(2) Date: Feb. 27, 2018

(87) PCT Pub. No.: WO2017/038531
PCT Pub. Date: Mar. 9, 2017

(65) Prior Publication Data
US 2018/0332612 A1    Nov. 15, 2018

(30) Foreign Application Priority Data
Aug. 31, 2015 (JP) .................................. 2015-171451

(51) Int. Cl.
| | |
|---|---|
| *H04W 72/14* | (2009.01) |
| *H04W 72/04* | (2009.01) |
| *H04W 28/04* | (2009.01) |
| *H04L 5/00* | (2006.01) |

(52) U.S. Cl.
CPC ......... *H04W 72/14* (2013.01); *H04W 72/042* (2013.01); *H04L 5/0044* (2013.01); *H04L 5/0055* (2013.01); *H04W 28/04* (2013.01)

(58) Field of Classification Search
CPC ... H04W 72/14; H04W 72/042; H04W 28/04; H04L 5/0044; H04L 5/0055
See application file for complete search history.

(56) References Cited

U.S. PATENT DOCUMENTS

| | | | |
|---|---|---|---|
| 2013/0272261 A1* | 10/2013 | Seo .................. | H04J 11/0056 370/329 |
| 2014/0064159 A1* | 3/2014 | Larsson ............ | H04W 72/0406 370/280 |

(Continued)

FOREIGN PATENT DOCUMENTS

| | | |
|---|---|---|
| WO | 2015/021185 A1 | 2/2015 |
| WO | 2015-060433 A1 | 4/2015 |

(Continued)

OTHER PUBLICATIONS

International Search Report issued in PCT/JP2016/074390 dated Nov. 8, 2016 (2 pages).

(Continued)

*Primary Examiner* — Ajay Cattungal
(74) *Attorney, Agent, or Firm* — Osha Bergman Watanabe & Burton LLP

(57) ABSTRACT

According to the present invention, low-latency communication in a next-generation mobile communication system can be achieved. A user terminal includes a receiving section configured to receive at least one piece of downlink control information out of first downlink control information that schedules reception of downlink data and second downlink control information that schedules transmission of uplink data; and a control section configured to perform a control to carry out communication using a transmission time interval (TTI) configuration, including an allocation section for receiving the downlink control information, a data section for carrying out reception of downlink data corresponding to the received downlink control information and/or transmission of uplink data, and a delivery acknowledgement section for carrying out reception and/or transmission of delivery acknowledgement information corresponding to predetermined data.

8 Claims, 15 Drawing Sheets

(56) References Cited

U.S. PATENT DOCUMENTS

| | | | |
|---|---|---|---|
| 2014/0086112 A1* | 3/2014 | Stern-Berkowitz | .......................... H04L 1/1822 370/280 |
| 2015/0078224 A1* | 3/2015 | Xiong | ..................... H04B 1/50 370/280 |
| 2016/0183276 A1* | 6/2016 | Marinier | ............... H04W 72/12 370/329 |
| 2016/0261296 A1* | 9/2016 | Ouchi | ...................... H04B 1/10 |
| 2016/0270115 A1* | 9/2016 | Mukkavilli | ........... H04L 5/0055 |
| 2016/0338049 A1* | 11/2016 | Takeda | .............. H04W 72/0446 |
| 2016/0353436 A1 | 12/2016 | Au et al. | |
| 2017/0026992 A1 | 1/2017 | Jiang et al. | |
| 2018/0019857 A1* | 1/2018 | Kazmi | ....................... H04L 5/14 |
| 2018/0132257 A1* | 5/2018 | Golitschek Edler von Elbwart | ................ H04L 5/1469 |

FOREIGN PATENT DOCUMENTS

| | | |
|---|---|---|
| WO | 2016148877 A1 | 9/2016 |
| WO | 2016196036 A1 | 12/2016 |
| WO | 2017014912 A1 | 1/2017 |

OTHER PUBLICATIONS

Written Opinion of the International Searching Authority issued in PCT/JP2016/074390 dated Nov. 8, 2016 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

InterDigital Communications, LLC; "Cross Carrier Operation for Bandwidth Extension"; 3GPP TSG-RAN WG1 Meeting #58 R1-093067; Shenzhen, China, Aug. 24-28, 2009 (7 pages).

Sunplus mMobile Inc.; "Clarification on the DL assignment/UL grant reception in SPS"; 3GPP TSG-RAN WG2 Meeting #66 R2-093430; San Francisco, USA, May 4-8, 2009 (5 pages).

ASUSTeK; "HARQ operation for SPS"; 3GPP TSG-RAN2 Meeting #64 R2-086597; Prague, Czech Republic, Nov. 10-14, 2008 (4 pages).

Nokia, Nokia Siemens Networks; "On the Number Of HARQ processes"; 3GPP TSG-RAN WG1 Meeting #51 R1-074889; Jeju, Korea, Nov. 5-9, 2007 (3 pages).

Motorola; "Downlink Control Signalling for E-UTRA TDD"; 3GPP TSG RAN1 LTE TDD AdHoc R1-071868; Beijing, China, Apr. 17-20, 2007 (3 pages).

Extended European Search Report issued in the counterpart European Patent Application No. 16841563.6, dated Feb. 27, 2019 (17 pages).

Office Action in counterpart European Patent Application No. 16 841 563.6 dated Jul. 1, 2020 (9 pages).

* cited by examiner

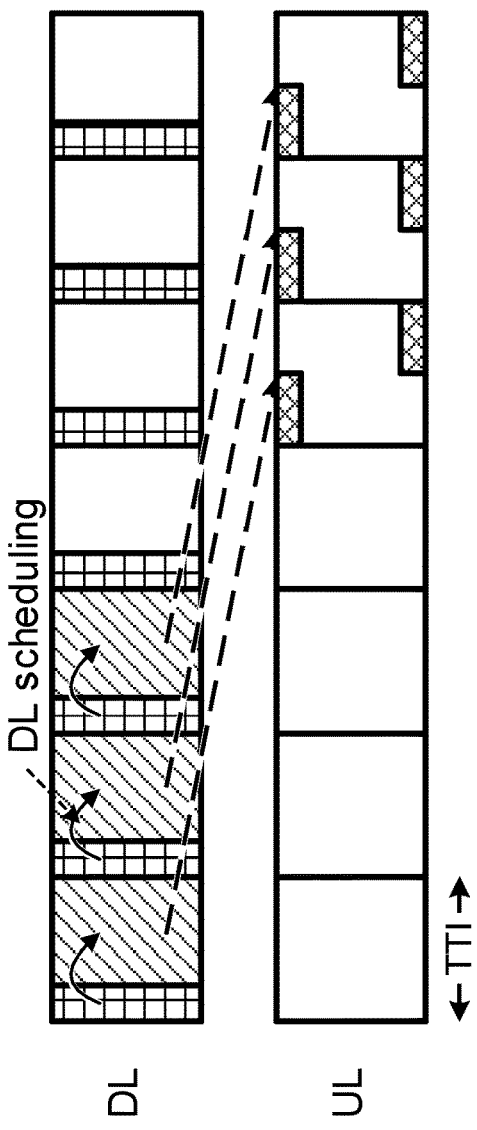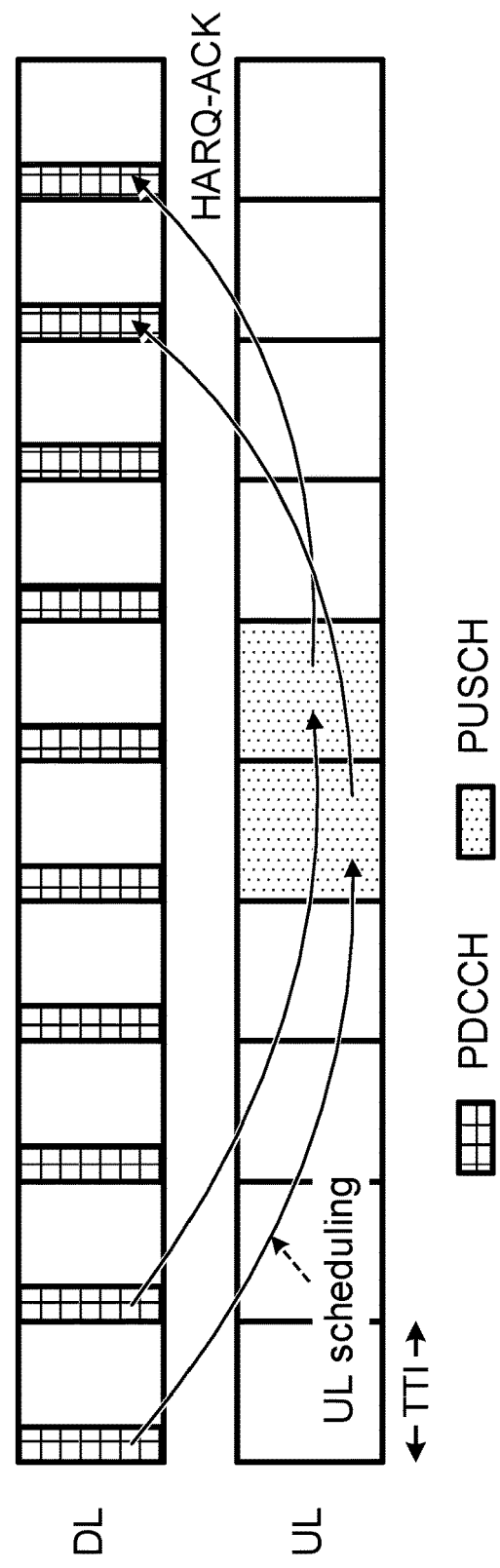
FIG. 2A
FIG. 2B

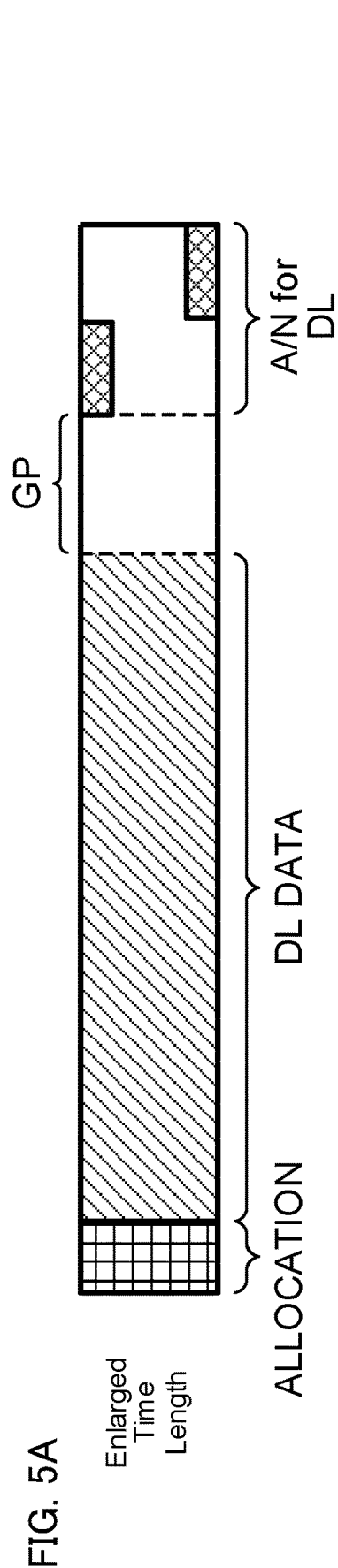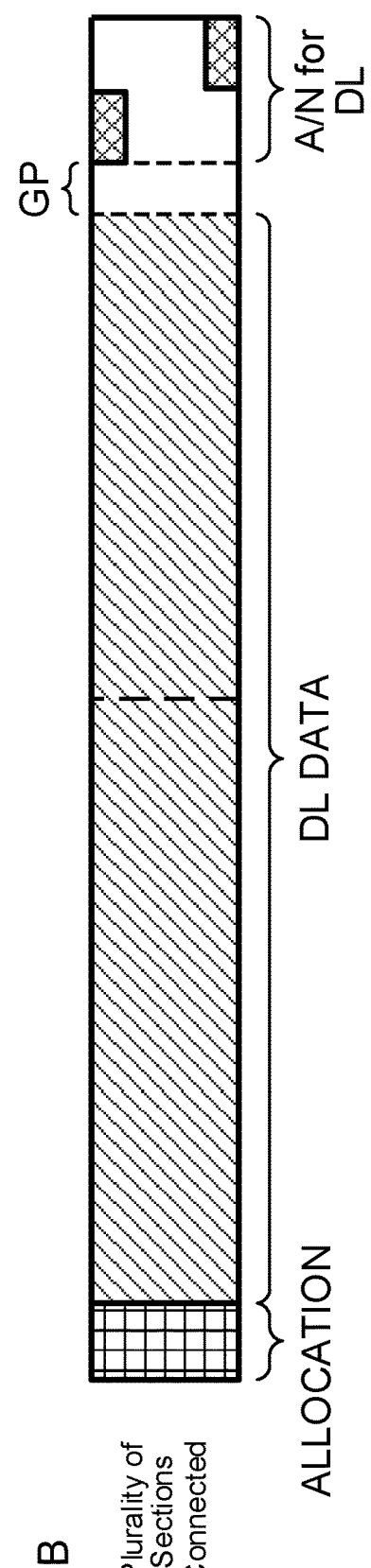

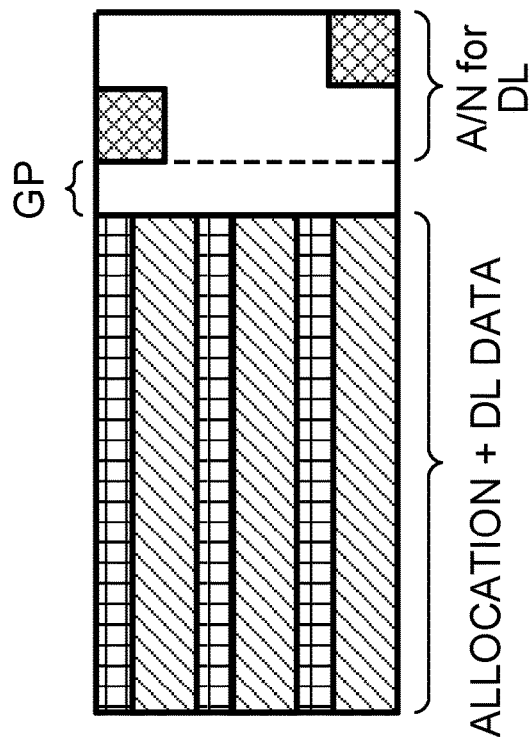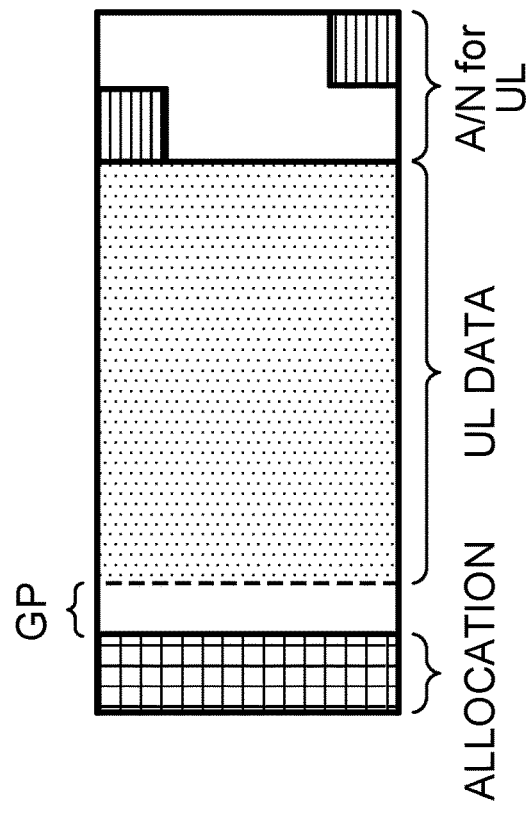
FIG. 6A
FIG. 6B

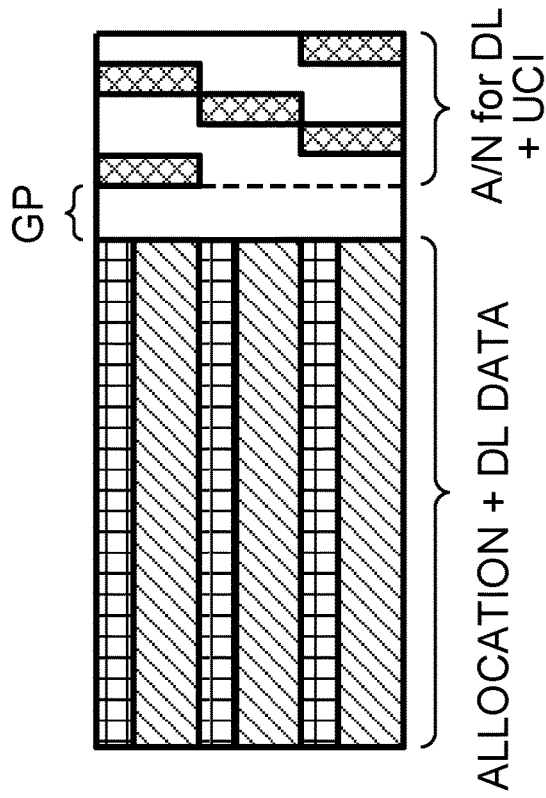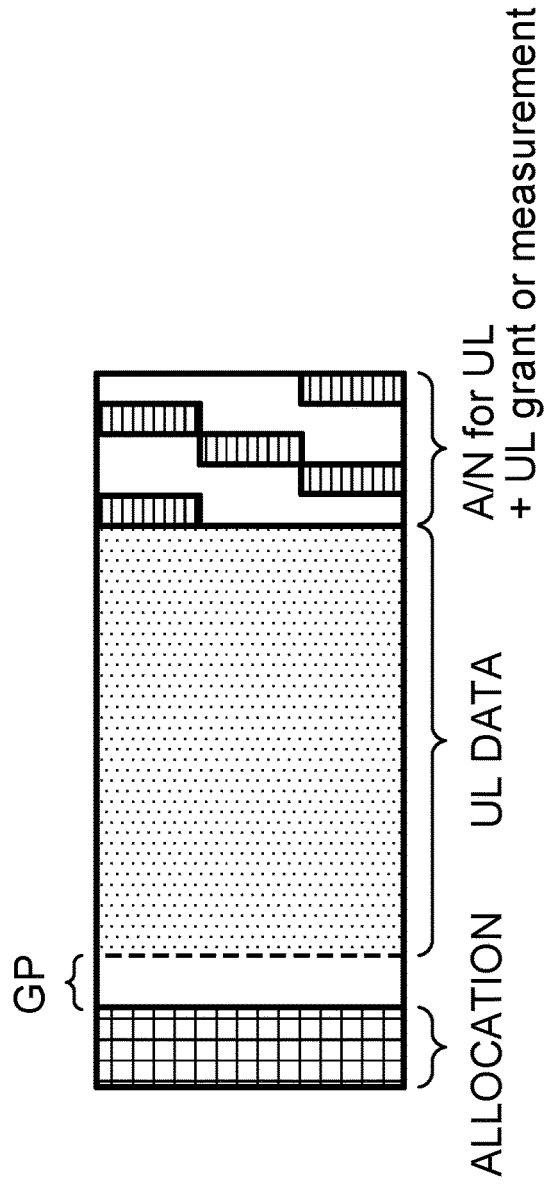
FIG. 7A
FIG. 7B

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purpose of further increasing high-speed data rates and providing low latency, etc. (non-patent literature 1). Furthermore, for the purpose of achieving further broadbandization and higher speed from LTE, successor systems to LTE (e.g., referred to as LTE-A (LTE-Advanced), FRA (Future Radio Access), 5G (5$^{th}$ Generation Mobile Communication System), New-RAT (Radio Access Technology), etc.) have also been studied.

In a radio communication system of LTE Rel. 13 and onwards (e.g., 5G), in order to flexibly and effectively utilize the given frequency spectrum, implementation of a flexible duplex scheme is being studied, in which each subframe can be dynamically used as a DL (Downlink) or a UL (Uplink). In flexible duplex, time/frequency resources for the DL/UL are not prescribed beforehand, and are dynamically changed in accordance with various conditions such as traffic and channel state, etc.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".

SUMMARY OF INVENTION

Technical Problem

However, in the scheduling of data transmission and reception in existing LTE, since it is necessary to secure future radio resources at an early timing, the maximum potential of the flexibility of the flexible duplex cannot be fully realized, so that there is a risk of not being able to achieve low-latency communication.

The present invention has been devised in view of the above problems, and it is an object of the present invention to provide a user terminal, a radio base station and a radio communication method which can achieve low-latency communication in a next-generation mobile communication system.

Solution to Problem

A user terminal, of an aspect of the present invention, includes a receiving section configured to receive at least one piece of downlink control information out of first downlink control information that schedules reception of downlink data and second downlink control information that schedules transmission of uplink data; and a control section configured to perform a control to carry out communication using a transmission time interval (TTI) configuration, including an allocation section for receiving the downlink control information, a data section for carrying out reception of downlink data corresponding to the received downlink control information and/or transmission of uplink data, and a delivery acknowledgement section for carrying out reception and/or transmission of delivery acknowledgement information corresponding to predetermined data.

Technical Advantageous of Invention

According to the present invention, low-latency communication can be achieved in a next-generation mobile communication system.

BRIEF DESCRIPTION OF DRAWINGS

FIG. 2A is a diagram showing HARQ-ACK transmission timing corresponding to DL scheduling, based on a DL grant; and FIG. 2B is a diagram showing HARQ-ACK transmission timing corresponding to UL scheduling, based on a UL grant.

FIG. 5A is a diagram showing an example of a TTI configuration in which a data section, a GP section and an A/N second are each longer than those in the configuration shown in FIG. 4B; and FIG. 5B is a diagram showing an example of a TTI configuration which connects two normal TTI lengths of FIG. 4B.

FIG. 6A is a diagram showing an example of a DL data TTI configuration; and FIG. 6B is a diagram showing an example of a UL data TTI configuration that can be simultaneously set with the DL data TTI configuration of FIG. 6A.

FIG. 7A is a diagram showing an example of a DL data TTI configuration; and FIG. 7B is a diagram showing an example of a UL data TTI configuration.

DESCRIPTION OF EMBODIMENTS

In an existing LTE system (Rel. 8 through 12), the radio base station (eNB: evolved Node B) schedules the transmission and reception of data to and from the user terminal (UE: User Equipment) using a downlink control channel. Specifically, DL scheduling and UL scheduling based on downlink control information (DCI: Downlink Control Information), notified by a PDCCH (Physical Downlink Control Channel)/EPDCCH (Enhanced PDCCH), are prescribed.

Figure 1:
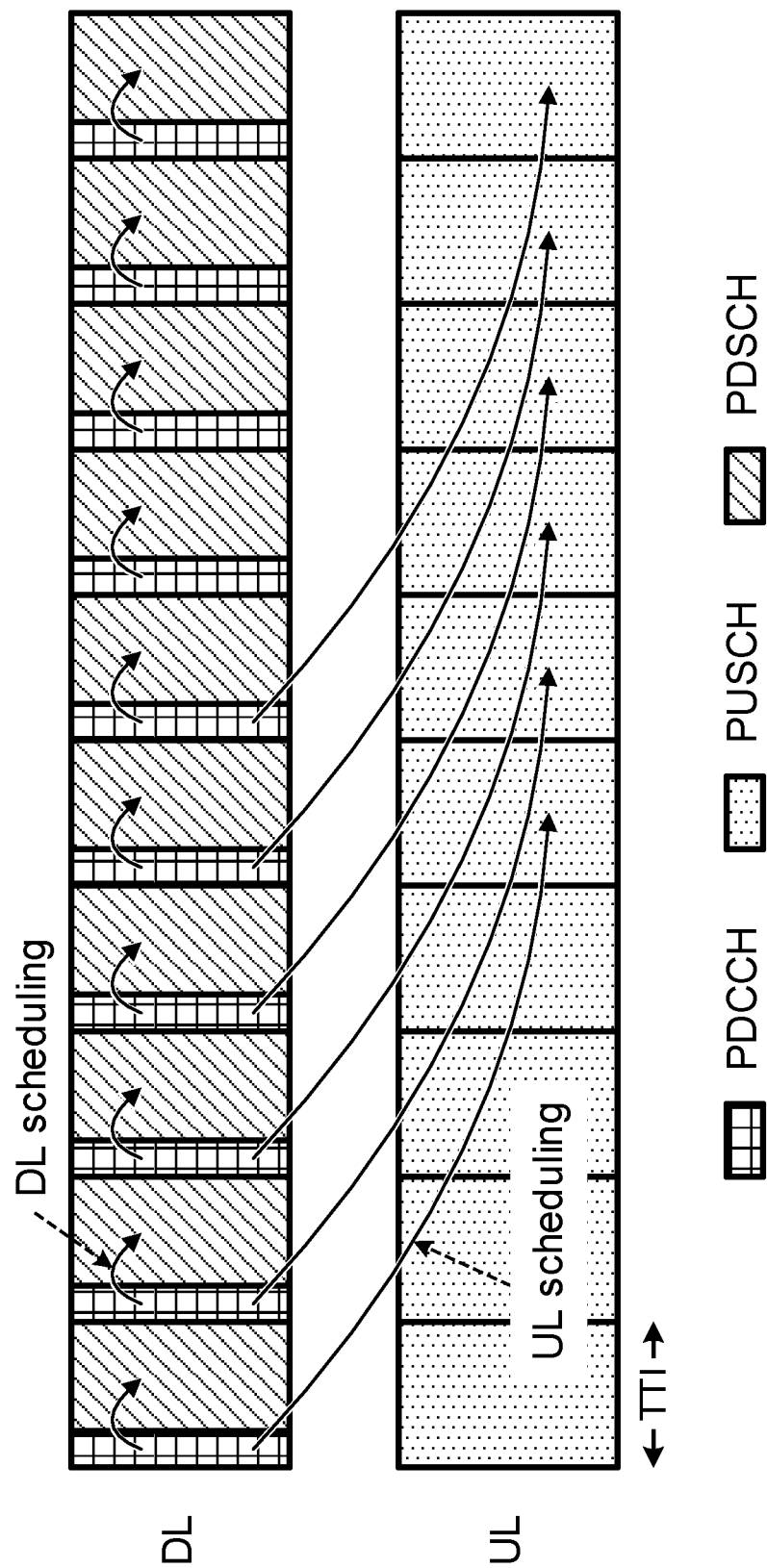
FIG. 1 is a diagram showing an example of scheduling data in an existing LTE system.

FIG. 1 is a diagram showing an example of scheduling data in an existing LTE system. FIG. 1 shows DL scheduling and UL scheduling instructed by the DCI received by the PDCCH. As shown in FIG. 1, the UE receives a PDSCH (Physical Downlink Shared Channel) in the same subframe as the subframe in which a DL grant (also referred to as a DL assignment (downlink assignment)) is detected according to, e.g., DCI format 1A, etc., based on the DL grant.

Furthermore, the UE transmits a PUSCH (Physical Uplink Shared Channel) in a subframe a predetermined interval after (e.g., 4 subframes after) a subframe in which a UL grant (uplink grant) is detected according to, e.g., DCI format 0/4 based on the UL grant.

Note that in FIG. 1 an example is shown in which a DL/UL grant is notified by a PDCCH; however, the corresponding relationship between the scheduling transmission time interval (TTI) and the scheduled TTI for the case of an EPDCCH is also the same as that in FIG. 1. Furthermore, different carriers (component carriers, CCs) may be used for carrying out transmission and reception of the DL grant and the PDSCH instead of the same carrier. Furthermore, the carrier for carrying out transmission and reception of the UL grant and the PUSCH may be the same.

Furthermore, in an existing LTE system, retransmission control via an HARQ (Hybrid Automatic Repeat reQuest) is used. In HARQ, the transmission side can determine whether to retransmit data or transmit new data by a feedback of delivery acknowledgement information (referred to as, e.g., retransmission control information, HARQ-ACK, ACK/NACK (A/N), etc.) from the reception side.

In an existing LTE system, a transmission/reception timing of the HARQ-ACK with respect to the UE is prescribed. FIG. 2 show diagrams of an example timing of an HARQ-ACK in an existing LTE system. FIG. 2A shows an HARQ-ACK transmission timing corresponding to DL scheduling based on a DL grant. The UE transmits an HARQ-ACK, in principle, after 4 subframes, or thereafter, upon receiving a PDSCH. Note that, as shown in FIG. 2A, the HARQ-ACK may support frequency hopping.

FIG. 2B shows an HARQ-ACK transmission timing corresponding to UL scheduling, based on a UL grant. The UE receives the HARQ-ACK, in principle, after 4 subframes, or thereafter, upon transmitting a PUSCH.

Furthermore, an existing LTE system utilizes a control based on TDD (Time Division Duplexing) and FDD (Frequency Division Duplexing). Specifically, in regard to time/frequency resources, it is strictly specified whether to use DL or use UL per predetermined unit (e.g., subframes for time resources, and component carriers (CCs) for frequency resources, etc.).

However, in a radio communication system of LTE Rel. and onwards (e.g., 5G), in order to flexibly and effectively utilize the given frequency spectrum, implementation of a flexible duplex scheme is being studied, in which each subframe can be dynamically used as a DL or a UL. In flexible duplex, time/frequency resources for the DL/UL are not prescribed beforehand, and are dynamically changed in accordance with various conditions such as traffic and channel state, etc.

Figure 3:
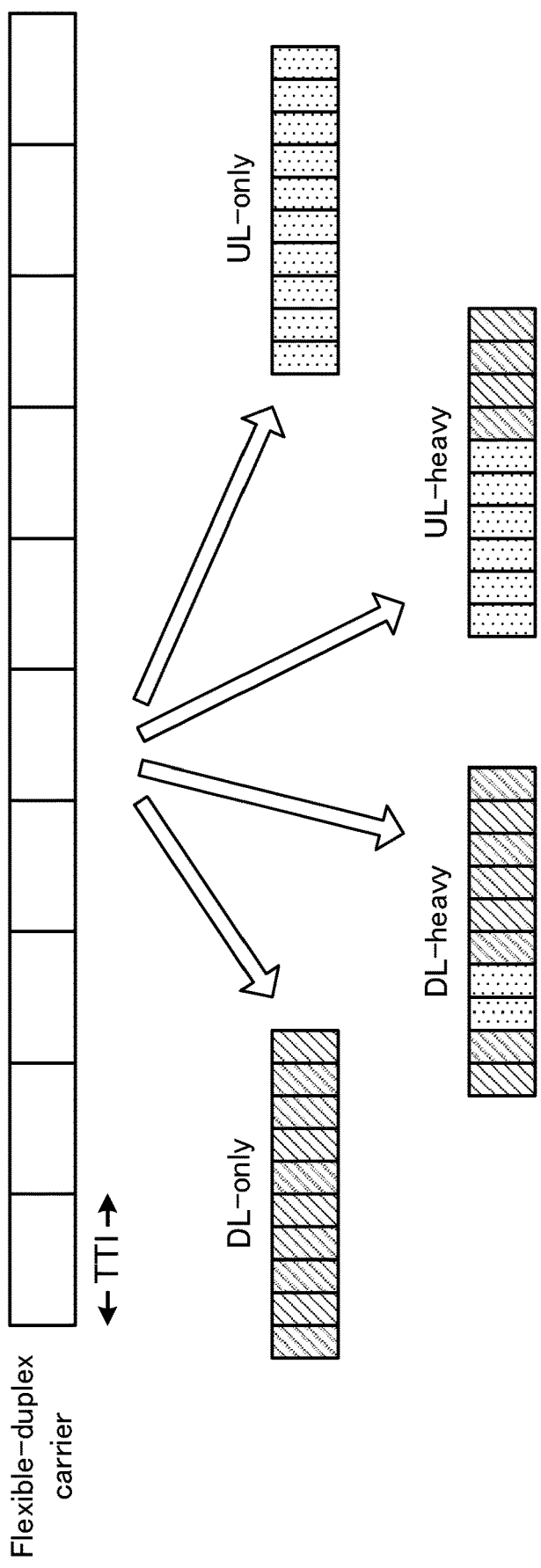
FIG. 3 is a diagram showing an example of allocation of radio resources in a carrier that utilizes flexible duplex.

FIG. 3 is a diagram showing an example of allocation of radio resources in a carrier that utilizes flexible duplex. In FIG. 3, ten TTIs of radio resources are shown. As shown in FIG. 3, it is possible to utilize the frequency spectrum in a carrier that utilizes flexible duplex as, e.g., DL-only (downlink transmission only), UL-only (uplink transmission only), DL-heavy (downlink transmission ratio is great), and UL-heavy (uplink transmission ratio is great).

Note that FDD can be carried out by combining the two frequency carriers, DL-only and UL-only, and TDD can be carried out by using a DL+UL setting.

However, it has not yet been studied in regard to exactly how flexible duplex should be implemented. For example, if attempts are made to implement a control that implements flexible duplex in an LTE system, a difference in the scheduling timing between the DL and the UL (the number of TTIs from the scheduling TTIs to the scheduled TTIs), as described above, becomes a problem.

For example, in an existing LTE, a UL resource is reserved a few subframes ahead at a scheduling timing that is notified by a UL grant. Accordingly, upon reaching the time to transmit the resource, even if another allocation is desired to be carried out (desired to change the allocation) at this time, such other allocation cannot be carried out.

Hence, in the scheduling of an existing LTE system, the maximum potential of the flexibility of the flexible duplex cannot be fully realized, and the improvement in the frequency usage efficiency and throughput deteriorates, so that it becomes difficult to suppress delay in regard to retransmission.

Consequently, the inventors of the present invention concentrated on the fact that if a control (inter-subframe scheduling) that extends over TTIs (subframes) is used, an older (timewise) control limits a newer control (a control at a later time). Furthermore, in inter-subframe scheduling, they also concentrated on the need for scheduling while taking future control content into consideration beforehand.

Based on these observations, the inventors of the present invention conceived the idea of reducing the scheduling timing as much as possible. Specifically, in regard to 5G, the idea of employing a physical layer configuration which can complete a notification of a downlink control signal, data transmission and reception, and HARQ transmission and reception in one time section (e.g., a TTI or subframe, etc.) of the same frequency was conceived. According to an aspect of the present invention, since the UE can be instructed to consistently schedule to the nearest time, a dynamic control of the DL and UL at each TTI can be effectively achieved. Furthermore, the RTT (Round Trip Time) of the HARQ can be suitably shortened.

Details of each embodiment according to the present invention will be described hereinbelow with reference to the drawings. The radio communication method according to each embodiment may be applied individually or applied as a combination thereof.

Furthermore, in the following embodiment, the TTI may be a subframe (1 ms) of an existing LTE system, may be a period that is shorter than 1 ms (e.g., 1 through 13 symbols), or may be a period that is longer than 1 ms.

Note that although downlink control information (may be referred to as "uplink scheduling information", "uplink scheduling control information", etc.) which schedules the transmission of uplink data is referred to as a "UL grant", and downlink control information (may be referred to as "downlink scheduling information", "downlink scheduling control information", etc.) which schedules downlink data reception is referred to as a "DL grant", such terminology is not limited thereto. Furthermore, downlink control information (downlink control signals) may be referred to as L1/L2 (Layer 1/Layer 2) control information (L1/L2 control signals), or may be simply referred to as L1 control information (L1 control signals).

(Radio Communication Method)

First Embodiment

In the first embodiment of the present invention, radio resources are mapped so that the UE carries out each of a reception of a downlink control signal, data transmission or reception, and HARQ transmission or reception in one time section (e.g., a TTI or subframe, etc.) of the same frequency. Furthermore, radio resources are mapped so that the eNB carries out each of a transmission of a downlink control signal, data transmission or reception, and HARQ transmission or reception in one time section of the same frequency.

Figure 4A:
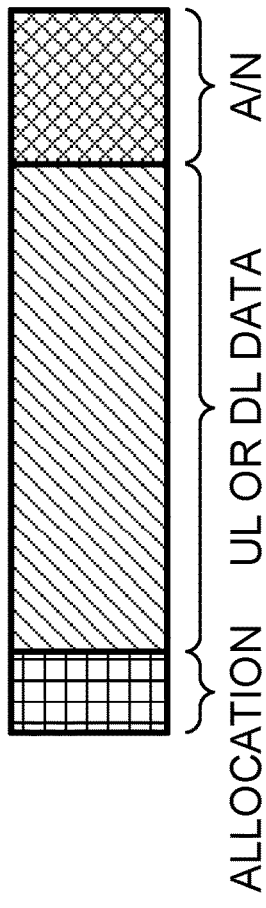
FIG. 4A is a schematic diagram of radio resource allocation according to a first embodiment.

FIG. 4 shows an example of a TTI configuration, according to the present invention. FIG. 4A is a schematic diagram of radio resource allocation according to a first embodiment. In the first embodiment, the radio resources are allocated in one time section, including an allocation section for allocating a downlink control signal (may be referred to as a "downlink control signal section", a "scheduling section", etc.), a data section for allocating data, and an A/N section (may be referred to as a "delivery acknowledgement section", "delivery acknowledgement information section", "HARQ section", etc.) for allocating an HARQ-ACK, in that order. Note that the lengths of the sections (periods) may use a desired combination.

Figure 4B:
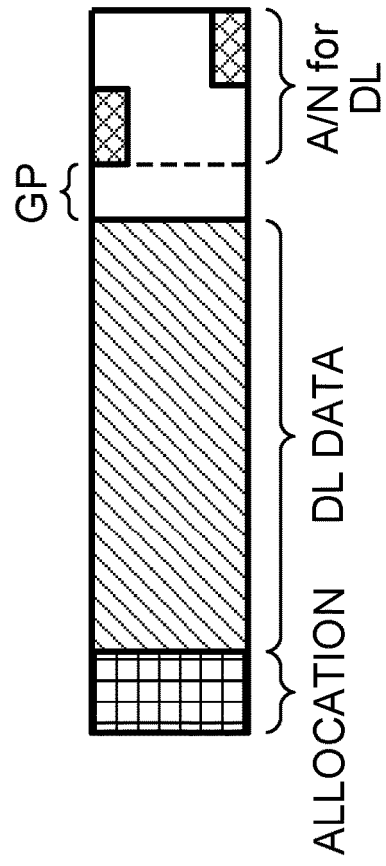
FIG. 4B is a diagram showing an example of radio resource allocation, for carrying out transmission and reception of DL data, according to the first embodiment.

The radio resource allocation of the UL data TTI and the DL data TTI are generally the same, however, there are some slight differences therebetween. FIG. 4B shows an example of radio resource allocation, for carrying out transmission and reception of DL data, according to the first embodiment. In the case of a DL data TTI, the UE receives, in the same manner as a PDCCH, a DL grant in the allocation section that includes allocation information; receives data based on the DL grant in the data section; and transmits an A/N in accordance with the reception the data in the A/N section.

The DL data TTI can have a configuration in which a non-transmission interval (may also be referred to as, e.g., a guard period (GP), a gap, CP section, etc.) is provided between the data section and the A/N section. By providing a guard period, DL/UL switching can be carried out within a TTI. The GP is implemented with the assumption that the UE applies a timing advance (TA). Note that a value larger than 0 can be set to the TA as a minimum value. Furthermore, after applying TA, a GP having a predetermined length may also be set in the interval from the transmission section to the reception section of the UE.

The CP may be set to, e.g., 20 μs, or may be set to one or more symbol intervals. The symbol intervals may be expressed in, e.g., OFDM (Orthogonal Frequency Division Multiplexing) symbol units, or may be expressed in bandwidth reciprocal (i.e., sampling length) units, or may be expressed in other units.

Furthermore, in a DL data TTI, a configuration is possible in which a GP is not provided or in which a GP is provided between the allocation section and the data section. Note that in the case where a plurality of GPs are provided within a TTI, the length of each GP may be the same or different.

Figure 4C:
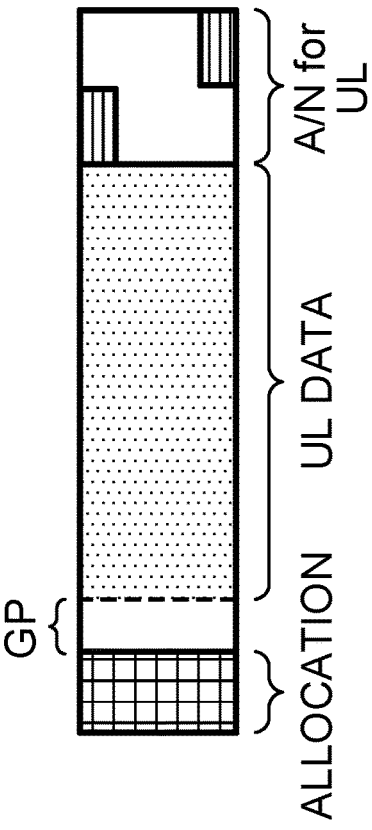
FIG. 4C is a diagram showing an example of radio resource allocation, for carrying out transmission and reception of UL data, according to the first embodiment.

FIG. 4C shows an example of radio resource allocation, for carrying out transmission and reception of UL data, according to the first embodiment. In the case of a UL data TTI, the UE receives a UL grant in the allocation section, transmits data based on the UL grant in the data section, and receives, in the A/N section, an A/N that is transmitted according to reception of the data from the eNB.

The UL data TTI can be configured to provide a GP between the allocation section and the data section. Furthermore, a configuration is possible in which a GP is not provided or in which a GP is provided between the data section and the A/N section.

Note that the TTI configuration may employ a configuration that increases the data payload per allocation, or a configuration in which a large GP is implemented in order to correspond to a large cell in which a large TA occurs. FIG. 5 shows diagrams of another example of a TTI configuration, according to the first embodiment. Although this example shows the case of a DL data TTI, the same configuration can also be employed for a UL data TTI.

For example, a plurality of different time-section lengths (TTI lengths) can be prescribed in each data TTI. If the DL data TTI of FIG. 4B is set as a normal (standard) TTI length, a TTI configuration like that of FIG. 5A may be used in which the TTI length is larger than a normal TTI length. In FIG. 5A, each of the data section, the GP section and the A/N section is configured longer than those in the configuration of FIG. 4B.

Furthermore, a configuration may be employed in which a new single time section (TTI) is formed by connecting a plurality of single time sections (TTIs). FIG. 5B shows a TTI configuration which connects two normal TTI lengths of FIG. 4B.

The following describes a specific control example, according to the first embodiment. First, the UE discerns each section length (the lengths of the allocation section, the data section and the A/N section) of the TTI configuration, according to the first embodiment.

Such information may be notified to the UE via higher layer signaling (e.g., RRC (Radio Resource Control) signaling, broadcast information (MIB (Master Information Block), SIB (System Information Block)), etc.). Furthermore, the UE may determine such information via notification of other information, or may determine such information from a configured frequency carrier.

The UE, in each TTI, initially monitors the allocation section, determines whether the TTI is a DL or a UL, and receives scheduling control information to the UE's own terminal address. The TTI determination may be carried out based on information which indicates that the TTI that receives downlink control information is either one of a DL data TTI and a UL data TTI (information that instructs whether the TTI is to be used in downlink data transmission, or to be used in uplink data transmission, and may be referred to as "TTI configuration instruction information" or "instruction information", etc.).

The TTI configuration instruction information may be included in the same control signal as the scheduling control information, or may be configured as a different control signal. Furthermore, in the case where TTI configuration instruction information is not included in the allocation section, the UE may determine the TTI configuration from the scheduling control information, or may determine an existing TTI configuration like those shown in FIG. 1 and FIG. 2. Furthermore, the TTI configuration instruction information may be used to indicate an existing TTI configuration.

Next, in accordance with these control signals, the UE carries out DL data reception or UL data transmission in a predetermined resource of the TTI. As shown in FIG. 4B, etc., the DL data reception may be time division multiplexed (TDMed) without a GP from the control signal, or as described later in FIG. 6A, may be frequency division multiplexed (FDMed) with the control signal.

Furthermore, the UL data reception can be TDMed with a control signal, and a GP can be set between the allocation section and the data section. The UE itself can determine and set the GP length based on the decoding delay or DL/UL switching time, or a timing advance, etc., applied to the UL data transmission section.

If the DL data reception is carried out, the UE transmits a delivery acknowledgement signal (ACK/NACK) based on the decoded result within the same TTI. In the DL data TTI, the data section and the A/N section can be TDMed, and a GP can be set between these sections. The UE itself can determine and set the GP length based on the decoding delay or DL/UL switching time, or a timing advance, etc., applied to the A/N section.

Note that the information regarding the GP length of the DL data TTI and/or the UL data TTI may be notified to the UE by higher layer signaling, downlink control information, or a combination thereof.

Furthermore, in the case where the radio base station carries out a control on the user terminal using an RRC CE (Control Element) and/or a MAC CE included in the DL data TTI, such a control may be applied after the TTI. For example, in the case where the timing advance of the user terminal is controlled by a timing advance command included in a MAC CE of the DL data, the transmission timing control may be carried out based on the timing advance command in a subsequent TTI, onwards. Unlike with an L1 control signal, control information included in a DL data signal requires time to decode and change the control method. Accordingly, by carrying out a control based on an L1 control signal in the same TTI while allowing a control based on higher layer signaling such as RRC and MAC to be carried out in a subsequent TTI, onwards, the circuit size of the terminal can be reduced.

FIG. 6 shows diagrams of an example variation of TTI configurations, according to the first embodiment. FIG. 6A is a diagram showing an example of a DL data TTI configuration; and FIG. 6B is a diagram showing an example of a UL data TTI configuration that can be simultaneously set with the DL data TTI configuration of FIG. 6A.

In the DL data TTI of FIG. 6A, the control information is FDMed with the data, similar to an existing EPDCCH. In other words, in this TTI, the allocation section and the data section overlap each other (in part or entirely), and are allocated in the same section (time).

Even in the case where the DL data TTI of FIG. 6A is used, the UL data TTI may use a configuration in which control information and the data are TDMed, like that shown in FIG. 6B (the same as FIG. 4C). In such a case, the UE trials a detection of the PDCCH (UL grant) in the UL data TTI allocation section. If the detection fails, the UE assumes that there is no possibility that the current TTI is a UL data TTI, and assumes that the current TTI is a DL data TTI, and advances to a blind decoding control of an EPDCCH.

In other words, if the UE detects a UL grant addressed to the UE in the TDM allocation section, UL data transmission is carried out, and if the UE detects a DL grant addressed to the UE in the FDM allocation section, DL data reception is carried out. Note that although it is desirable for the FDM allocation section to be longer than the TDM allocation section, the present invention is not limited thereto.

In the above-mentioned FIGS. 4 through 6, although the mapping of the ACK/NACK is configured to hop at the frequency carrier ends every half-interval of the A/N section, the present invention is not limited thereto. For example, a configuration is possible in which frequency hopping is carried out in more symbols. In this regard, a description will be given with reference to FIG. 7. FIG. 7 shows another example of a variation of a TTI configuration, according to the present invention. FIG. 7A shows an example of a DL data TTI configuration, and FIG. 7B shows an example of a UL data TTI configuration.

In the A/N section in the DL data TTI, uplink control information (UCI) other than an A/N (e.g., a CQI (Channel Quality Indicator), an RI (Rank Indicator), etc.) may be transmitted in addition to an A/N for uplink data. In such a case, as shown in FIG. 7A, a configuration is possible in which the UCI is transmitted in a wider bandwidth (and/or frequency hopped).

In the A/N section in the UL data TTI, a UL grant for a subsequent TTI (one subsequent TTI), a measurement signal (e.g., a cell-specific reference signal (CRS), channel state information reference signal (CSI-RS), etc.) may be transmitted in addition to an A/N for downlink data. The UE may, in the A/N section, trial a blind detection of a UL grant or carry out sounding by measuring a predetermined reference signal (RS) that is preset in higher layer signaling.

Note that the information regarding the TTI configuration may be notified to the UE by higher layer signaling (e.g., RRC signaling, broadcast information, etc.), downlink control information or a combination thereof. Furthermore, the UE may determine such information via notification of other information, or determine from a set frequency carrier.

For example, the UE may receive information regarding the corresponding relationship between the TTI configuration and predetermined numbers (e.g., may be referred to as a TTI configuration index), via RRC signaling, as information regarding the TTI configuration. Furthermore, in the case where the UE receives a TTI configuration index, which identifies a TTI configuration to be used, via RRC signaling and/or downlink control information, the UL data TTI and/or DL data TTI to be used can be renewed based on the received TTI configuration index.

In addition, information regarding the section length (including the GP section) of the above-described TTI configuration, information regarding the multiplexing method (TDM, FDM, etc.) of the allocation section and the data section, information regarding the bandwidth and/or hopping pattern of the signal in the A/N section, and information regarding a reference signal configuration (e.g., a CSI-RS configuration index) that is multiplexed in the A/N section, etc., may be notified as information regarding the TTI configuration.

According to the above-described first embodiment, since a physical layer configuration, which can allocate each of a downlink control signal, data and an A/N within one time section of the same frequency is used for a UE and an eNB to communicate, the time from when the eNB notifies scheduling information until the UE carries out transmission/reception based on such information can be favorably reduced. Furthermore, the RTT of the HARQ can be favorably reduced.

Second Embodiment

In the first embodiment, a TTI configuration is disclosed for the case where TDD is applied to a frequency carrier. The second embodiment discloses a TTI configuration for the case where FDD is applied to a plurality of frequency carriers (e.g., CCs).

In the second embodiment, a physical layer configuration is used which transmits each of a downlink control signal, data and an A/N within one time section using a plurality of frequencies. Specifically, in a DL carrier for DL transmission usage, a downlink control signal, downlink data, and an A/N for uplink data are transmitted. In a UL carrier for UL transmission usage, since a downlink control signal is not transmitted, uplink data, and an A/N for downlink data are transmitted.

Figure 8:
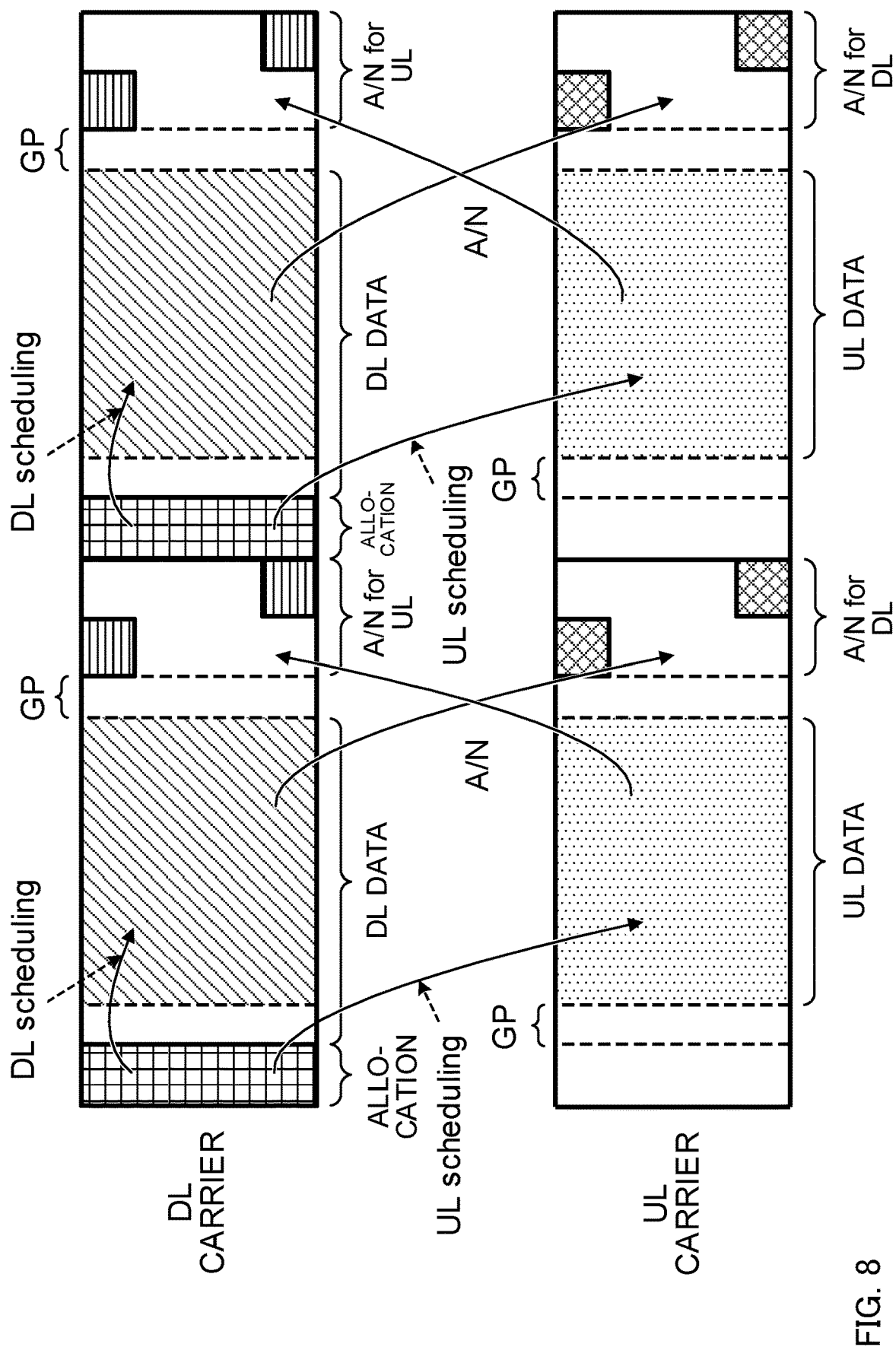
FIG. 8 is a diagram showing an example of a TTI configuration according to the second embodiment.

The essence of the second embodiment lies in the carrying out of cross-carrier scheduling, and the carrying out of cross-carrier HARQ feedback. FIG. 8 is a diagram showing an example of a TTI configuration according to the second embodiment. In FIG. 8, the UE is configured to perform communication using two carriers (a DL carrier and a UL carrier).

As shown in FIG. 8, scheduling control information of UL data is transmitted in the DL carrier (cross-carrier scheduling). Furthermore, in order for the A/N to be transmitted in the A/N section of the same TTI as the data, the A/N for uplink data is transmitted in the DL carrier, and the A/N for downlink data is transmitted in the UL carrier.

In the TTI configuration of the second embodiment, although both uplink and downlink transmission do not occur in on frequency carrier, a non-transmission interval (GP) may be provided between each section with consideration of processing delays relating to the cross-carrier control.

Hence, according to the second embodiment, even if FDD is applied to a plurality of frequency carriers, notification of a downlink control signal, data transmission/reception and HARQ transmission/reception can be completed in a time section. FDD, compared to TDD, does not need to synchronize between cells and/or operators, hence, restrictions on the network can be relaxed.

Note that the FDD according to the second embodiment may be carried out using three or more carriers.

Furthermore, the user terminal may be configured to report, to the radio base station beforehand, UE capability information in regard to whether or not two, or three or more, carriers can be used to apply the FDD according to the second embodiment. Furthermore, the user terminal may report, independently of the above-mentioned UE capability information in regard to whether or not FDD can be applied, UE capability information in regard to whether or not one out of the two, or three or more, carriers (e.g., two, or three or more, carriers that apply FDD), can be used to apply the FDD according to the first embodiment. In other words, the user terminal can report to the radio base station that it has one or both of: the capability of applying FDD, according to the second embodiment, using two, or three or more, carriers; and the capability of applying TDD using one of those carriers.

Modified Embodiment of Second Embodiment

Although the second embodiment uses physical layer configuration which transmits each of a downlink control signal, data corresponding to the downlink control signal, and an A/N corresponding to such data within one time section using a plurality of frequencies, this configuration can be slightly modified in order to improve the usage efficiency of the radio resources.

Figure 9:
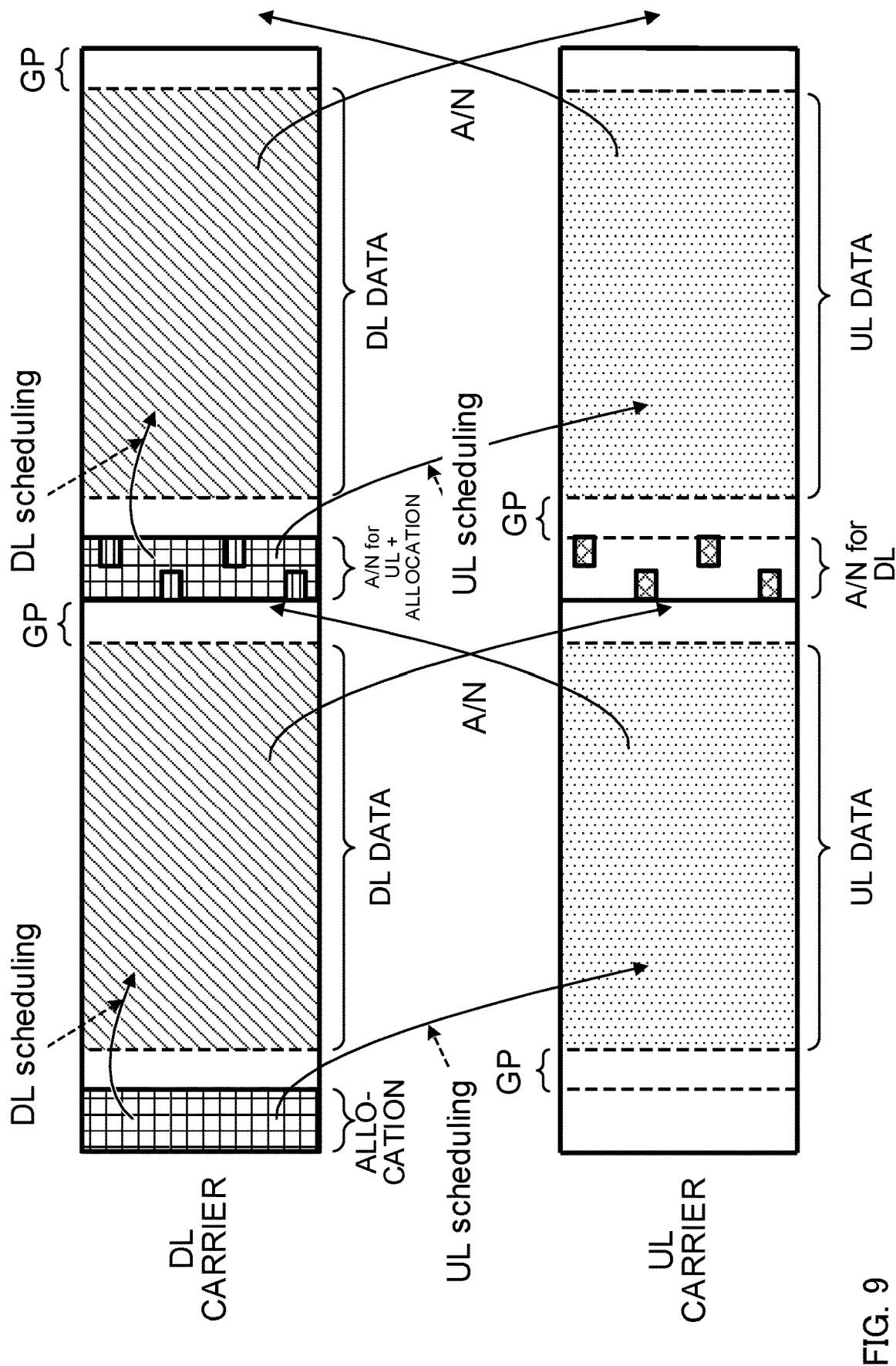
FIG. 9 is a diagram showing an example of a TTI configuration according to a modified embodiment of the second embodiment.

FIG. 9 is a diagram showing an example of a TTI configuration according to a modified embodiment of the second embodiment. In this example, an A/N for a UL data of a predetermined TTI is multiplexed in an allocation section in the DL carrier of a subsequent (e.g., the next) TTI. In this case, since the A/N section of the tail end of each TTI that are present in FIG. 8 can be omitted, the data section is expanded (extended). Furthermore, the A/N for DL data of a predetermined TTI is allocated to overlap with the allocation section of the DL carrier in the UL carrier of a subsequent (e.g., the next) TTI. In other words, in the next TTI, the allocation section and the A/N section overlap each other, and are allocated in the same section (time).

Note that this modified embodiment (a configuration in which the allocation section and the A/N section are allocated in the same section (time)) may be applied to, e.g., the UL data TTI of the first embodiment.

Furthermore, in the second embodiment, the length of each time section may be the same for the DL carrier and the UL carrier, or may be different. For example, for the purpose of ensuring coverage in the uplink, which has a small transmission power compared to that of the downlink, the A/N section for the downlink data may be configured to be longer than the A/N section for the uplink data.

Figure 10:
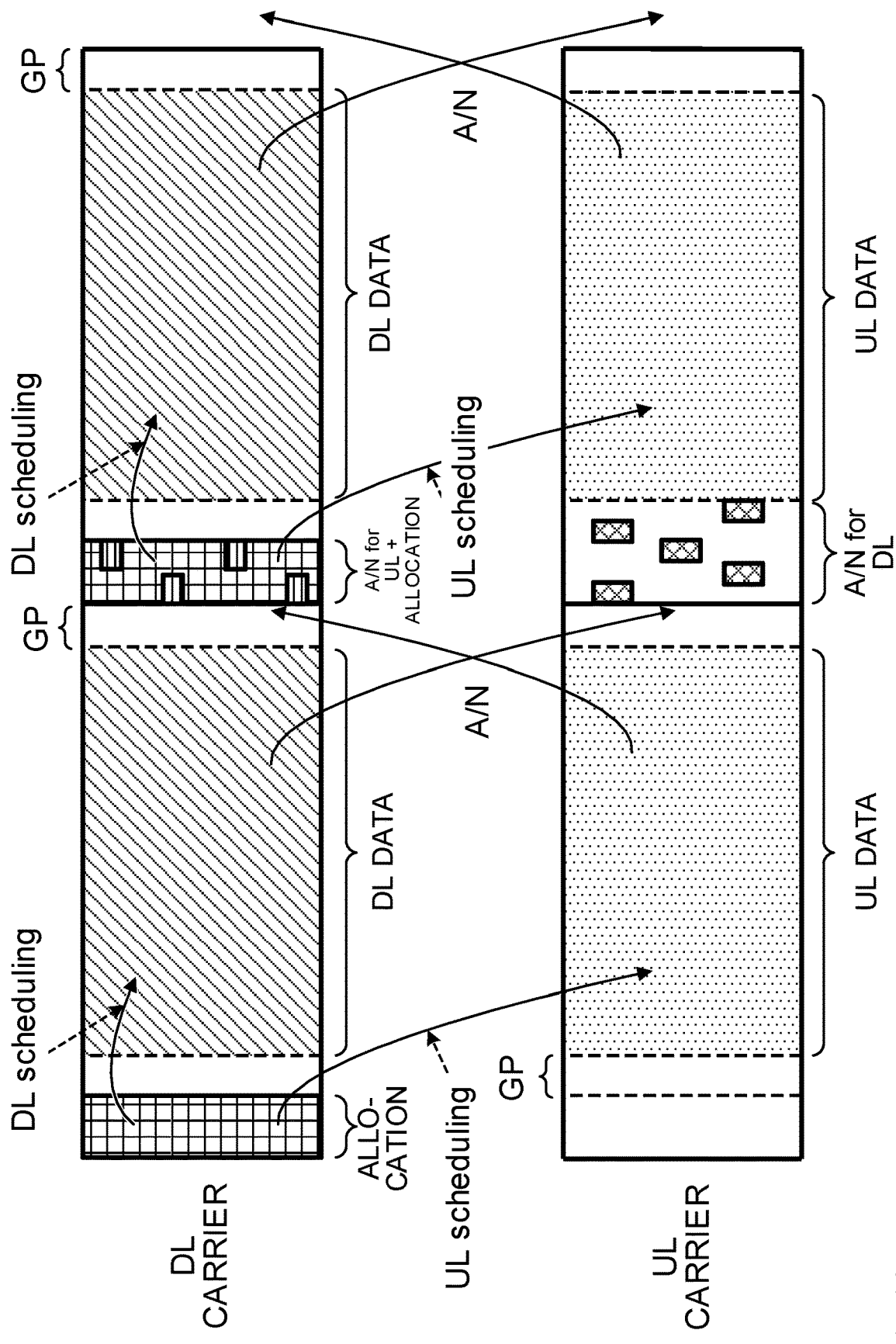
FIG. 10 is a diagram showing another example of a TTI configuration according to a modified embodiment of the second embodiment.

FIG. 10 is a diagram showing another example of a TTI configuration according to a modified embodiment of the second embodiment. In this example, the A/N section for downlink data is configured longer than the A/N section for uplink data. Note that in FIG. 10, similar to FIG. 9, the A/N section for UL data of a predetermined TTI is multiplexed with the allocation section in the DL carrier of the next TTI; however, the A/N section length can be made different in the same manner as the configuration disclosed in FIG. 8.

In the case of FIG. 10, in order to ensure coverage for the UE, A/Ns are allocated in a large number of symbols and over a wide bandwidth in the A/N section for downlink data, in the same manner as in FIG. 7.

According to the modified embodiment of the second embodiment, even in the case where a plurality of frequency carriers apply FDD, a TTI configuration having an improved usage efficiency of radio resources and a TTI configuration that ensures coverage can be achieved.

(Radio Communication System)

The following description concerns the configuration of a radio communication system according to an embodiment of the present invention. In this radio communication system, communication is carried out using one or a combination of the radio communication methods of the embodiments of the present invention.

Figure 11:
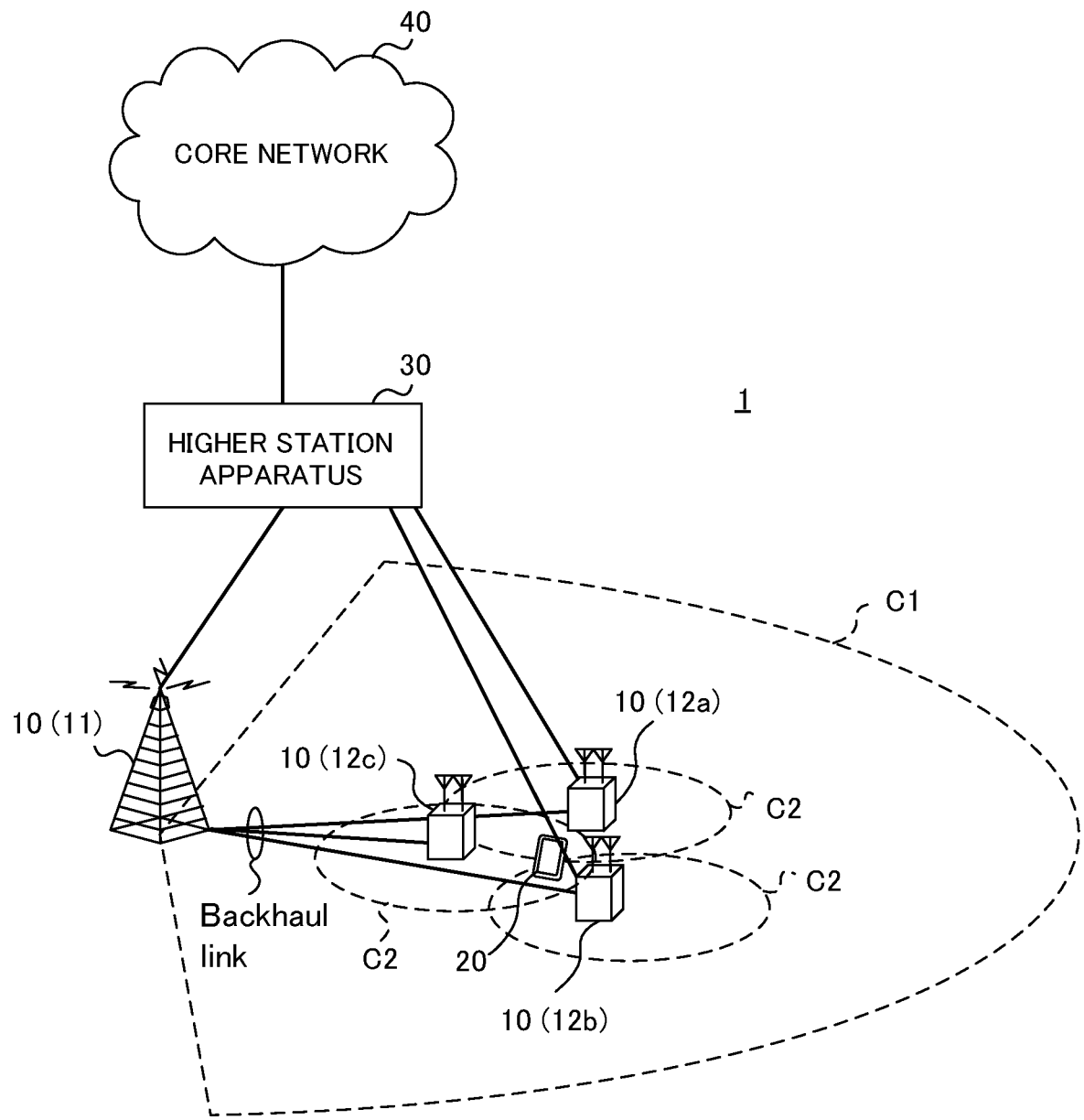
FIG. 11 is an illustrative diagram of a schematic configuration of a radio communication system of according to an illustrated embodiment of the present invention.

FIG. 11 shows an example of a schematic configuration of the radio communication system according to an embodiment of the present invention. The radio communication system 1 can apply carrier aggregation (CA) and/or dual connectivity (DC), which are an integration of a plurality of fundamental frequency blocks (component carriers), having the system bandwidth (e.g., 20 MHz) as 1 unit.

Note that this radio communication system may also be referred to as LTE (Long Term Evolution), LTE-A (LTE-Advanced), LTE-B (LTE-Beyond), SUPER 3G, IMT-Advanced, 4G ($4^{th}$ Generation Mobile Communication System), 5G ($5^{th}$ Generation Mobile Communication System), FRA (Future Radio Access), New-RAT (Radio Access Technology), etc., or referred to as a system that achieves these.

The radio communication system 1 shown in FIG. 11 includes a radio base station 11 which forms a macro cell C1 having a relative wide coverage, and a radio base station (12a through 12c) provided within the macro cell C1 and forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cells C2 via CA or DC. Furthermore, the user terminal 20 can apply CA or DC using a plurality of cells (CCs) (e.g., five or less CCs, or six or more CCs).

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station (or between two radio base stations 12).

The radio base station 11 and each radio base station 12 are connected to a host station apparatus 30, and are connected to the core network 40 via the host station apparatus 30. The host station apparatus 30 includes, but is not limited to, an access gateway apparatus, a radio network controller (RNC), and a mobility management entity (MME), etc. Furthermore, each radio base station 12 may be connected to the host station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished.

Each user terminal 20 is compatible with each kind of communication scheme such as LTE, LTE-A, etc., and also includes a fixed communication terminal in addition to a mobile communication terminal.

In the radio communication system 1, OFDMA (Orthogonal Frequency Division Multiple Access) is applied to the downlink and SC-FDMA (Single-Carrier Frequency Division Multiple Access) is applied to the uplink as radio access schemes. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that the uplink and downlink radio access schemes are not limited to these combinations.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and an SIB (System Information Block) are transmitted on the PDSCH. Furthermore, an MIB (Master Information Block), etc., is transmitted on the PBCH.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. An HARQ (Hybrid Automatic Repeat reQuest) delivery acknowledgement signal (referred to as, e.g., retransmission control information, HARQ-ACK, ACK/NACK, etc.) for the PUSCH is transmitted by the PHICH. An EPDCCH that is frequency-division-multiplexed with a PDSCH (downlink shared data channel) can be used for transmitting the DCI in the same manner as the PDCCH.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Downlink radio quality information (CQI: Channel Quality Indicator) and delivery acknowledgement information, etc., are transmitted via the PUCCH. A random access preamble for establishing a connection with a cell is transmitted by the PRACH.

In the radio communication system 1, a cell-specific reference signal (CRS), channel state information reference signal (CSI-RS), a demodulation reference signal (DMRS), and a positioning reference signal (PRS), etc., are transmitted as downlink reference signals. Furthermore, in the radio communication system 1, a measurement reference signal (SRS: Sounding Reference Signal) and a demodulation reference signal (DMRS), etc., are transmitted as uplink reference signals. Note that the DMRS may be referred to as a user terminal specific reference signal (UE-specific reference signal). Furthermore, the transmitted reference signals are not limit to the above.

<Radio Base Station>

Figure 12:
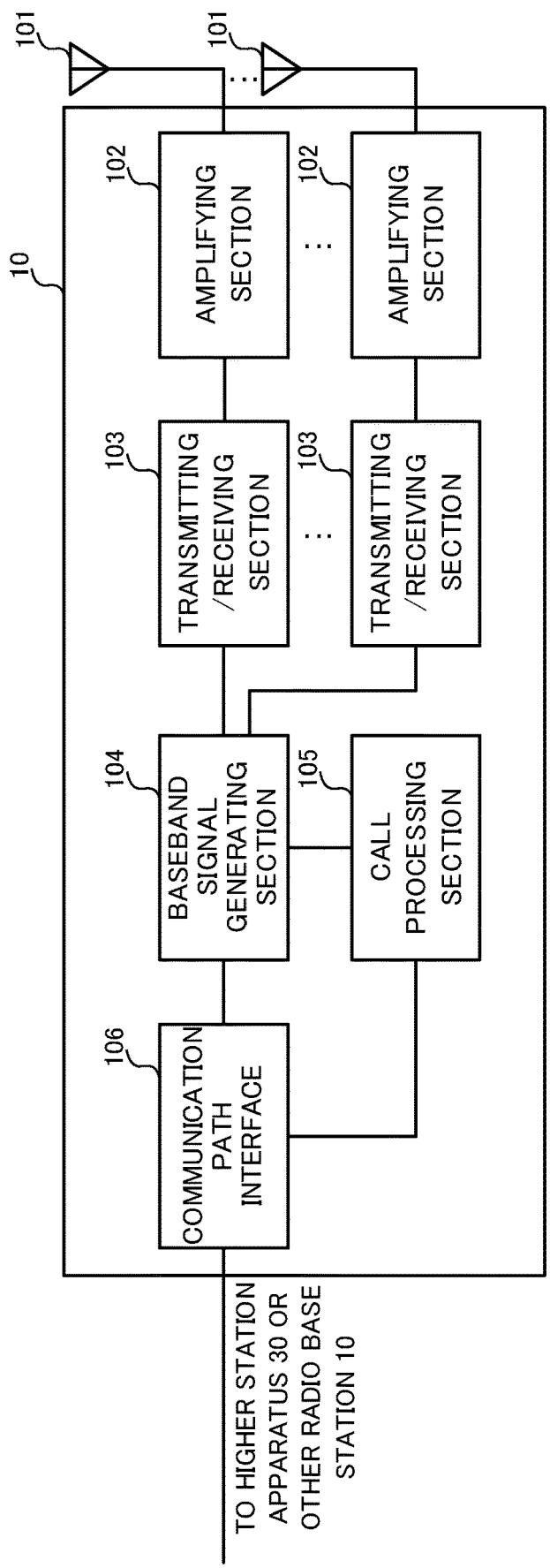
FIG. 12 is an illustrative diagram showing an overall configuration of a radio base station according to the illustrated embodiment of the present invention.

FIG. 12 is a diagram illustrating an overall configuration of the radio base station according to an embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Note that the transmission/reception antennas 101, the amplifying sections 102, and the transmitting/receiving sections 103 may be configured to include one or more thereof, respectively.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control)

retransmission control (e.g., HARQ transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101. Based on common recognition in the field of the art pertaining to the present invention, each transmitting/receiving section 103 can be configured as a transmitter/receiver, a transmitter/receiver circuit or a transmitter/receiver device. Note that each transmitting/receiving section 103 may be configured as an integral transmitting/receiving section or may be configured as a transmitting section and a receiving section.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with another radio base station 10 via an inter-base-station interface (for example, optical fiber or X2 interface compliant with CPRI (Common Public Radio Interface)).

Note that the transmitting/receiving sections 103 transmit a DCI regarding transmission and/or reception of data to the user terminal 20 in an allocation section determined by the control section 301. For example, the transmitting/receiving sections 103 may transmit instruction information (DL grant) for the reception of a downlink shared channel (PDSCH). Furthermore, the transmitting/receiving sections 203 may transmit instruction information (UL grant) for the transmission of an uplink shared channel (PUSCH). These DCIs may be transmitted in the same TTI, or may be transmitted in different TTIs.

The transmitting/receiving sections 103 transmit downlink data (PDSCH) in a data section for a DL data TTI determined by the control section 301. Furthermore, the transmitting/receiving sections 103 may transmit an HARQ-ACK for uplink data (PUSCH) in a delivery acknowledgement section for a UL data TTI determined by the control section 301. Furthermore, the transmitting/receiving sections 103 may transmit TTI configuration instruction information in an allocation section determined by the control section 301.

The transmitting/receiving sections 103 receive uplink data in an uplink shared channel (e.g., a PUSCH) from the user terminal 20 in a data section for a UL data TTI determined by the control section 301. The transmitting/receiving sections 103 receive an HARQ-ACK for downlink data transmitted in a downlink shared channel (PDSCH) in a delivery acknowledgement section of a DL data TTI determined by the control section 301.

Figure 13:
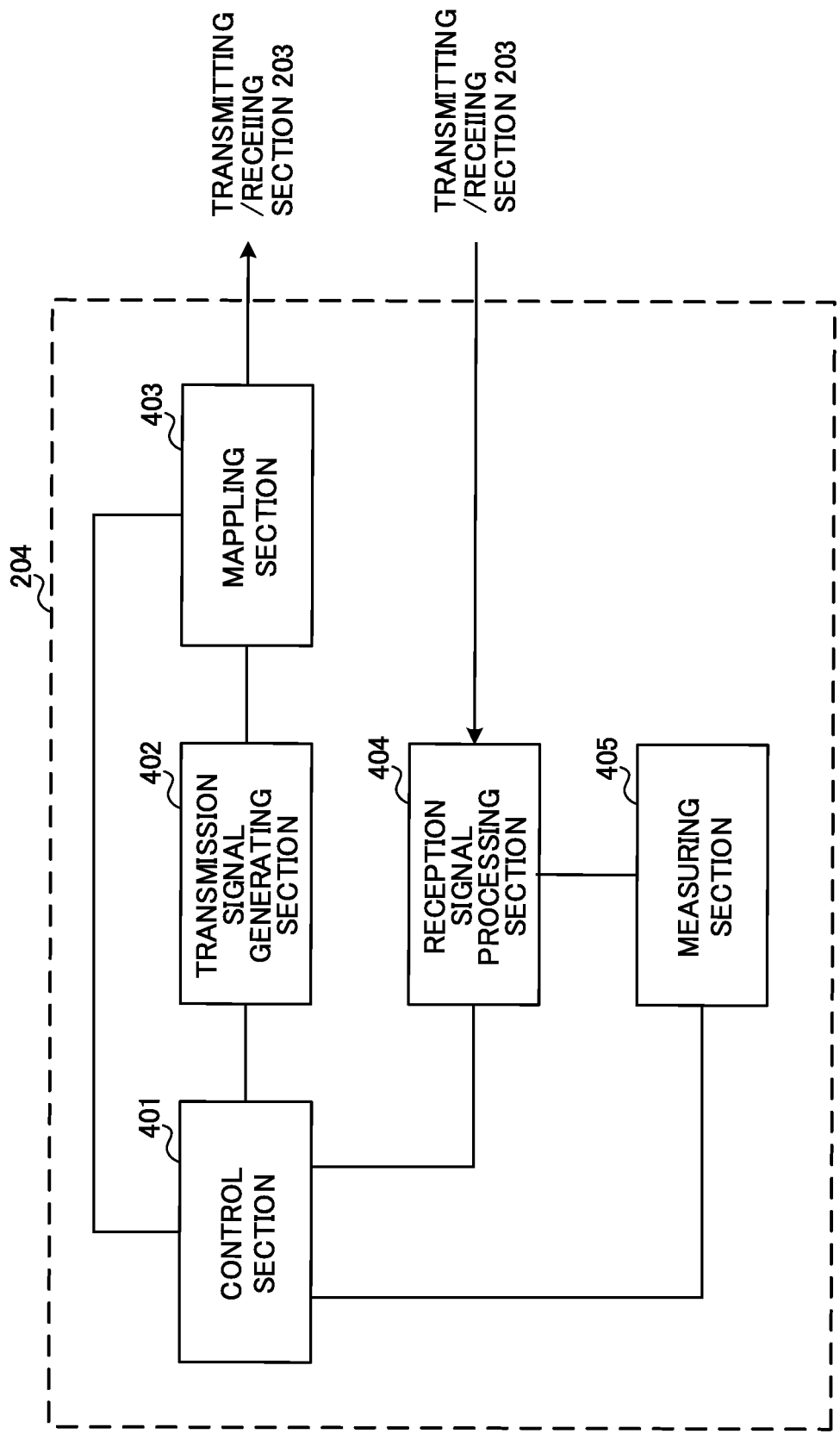
FIG. 13 is an illustrative diagram of a functional configuration of the radio base station according to the illustrated embodiment of the present invention.

FIG. 13 is a diagram illustrating the functional configurations of the radio base station according to the present embodiment. Note that although FIG. 13 mainly shows functional blocks of the features of the present embodiment, the radio base station 10 is also provided with other functional blocks that are necessary for carrying out radio communication. As illustrated in FIG. 13, the baseband signal processing section 104 is provided with at least a control section (scheduler) 301, a transmission signal generating section 302, a mapping section 303, a reception signal processing section 304, and a measuring section 305.

The control section (scheduler) 301 performs the entire control of the radio base station 10. Based on common recognition in the field of the art pertaining to the present invention, the control section 301 can be configured as a controller, a control circuit or a control device.

The control section 301 controls, e.g., the generation of signals by the transmission signal generating section 302, and the allocation of signals by the mapping section 303. Furthermore, the control section 301 controls the reception processes of signals by the reception signal processing section 304, and the measurement of signals by the measuring section 305.

The control section 301 controls the scheduling (e.g., resource allocation) of the system information, downlink data signals transmitted by a PDSCH, and downlink control signals transmitted by a PDCCH and/or EPDCCH. Furthermore, control of scheduling of downlink reference signals such as synchronization signals (PSS (Primary Synchronization Signal)/SSS (Secondary Synchronization Signal), CRSs, CSI-RSs, DMRSs, etc., is carried out.

Furthermore, the control section 301 controls the scheduling of the uplink data signals transmitted in a PUSCH, the uplink control signals transmitted by a PUCCH and/or a PUSCH (e.g., delivery acknowledgment signal), a random access preamble transmitted by a PRACH, and an uplink reference signal, etc.

The control section 301 controls the transmission and/or reception of each TTI based a predetermined TTI configuration. The TTI configuration prescribes a start timing and section length of a section (allocation section) for receiving downlink control information, a section (data section) for carrying out transmission and reception data, and a section (delivery acknowledgement section) for carrying out transmission and reception of an A/N, etc. Note that each section may be provided adjacent to each other with respect to time (in which the next section starts immediately after the previous section), or a non-transmission section (also referred to as a non-reception section or a guard section) may be further provided between each section.

Specifically, the control section 301 performs a control, in units of 1 TTI or 2 TTIs, to carry out transmission of downlink control information (e.g., DCI), reception and/or transmission of data corresponding to the downlink control information, and transmission and/or reception of an A/N corresponding to predetermined data. Note that in the case of a unit of 2 TTIs, a configuration of one 2 TTI unit and a configuration of another 2 TTI unit can overlap with 1 TTI.

For example, the control section 301 may perform a control to carry out communication using a TTI configuration, as a DL data TTI, that provides a data section after an allocation section, for transmitting a DL grant, provides a non-transmission section after the data section, and provides a delivery acknowledgement section after the non-transmission section.

Furthermore, the control section 301 may perform a control to carry out communication using a TTI configuration, as a DL data TTI, in which a data section overlaps with an allocation section, for transmitting a DL grant, provides a non-transmission section after the data section, and provides a delivery acknowledgement section after the non-transmission section.

Furthermore, the control section 301 may perform a control to carry out communication using a TTI configuration, as a UL data TTI, that provides a non-transmission section after an allocation section, for transmitting a UL grant, provides a data section after the non-transmission section, and provides a delivery acknowledgement section after the data section.

The control section 301 may transmit, in an allocation section of a predetermined TTI, TTI configuration instruction information to be used by the user terminal 20 when determining the TTI configuration.

Furthermore, in the case where a plurality of carriers are set in the user terminal 20, the control section 301 may set one carrier as a downlink carrier (DL carrier), and another carrier as an uplink carrier (UL carrier).

The control section 301 may perform a control to carry out communication using a TTI configuration, in a DL carrier (first carrier), that provides a data section (first data section) for transmitting downlink data corresponding to a DL grant transmitted in a first allocation section after an allocation section (first allocation section), for transmitting a DL grant (first downlink control information) and/or a UL grant (second downlink control information); and provides a delivery acknowledgement section (first delivery acknowledgement section), for transmitting an A/N corresponding to uplink data received in a data section (second data section) of a UL carrier of a predetermined TTI after the first data section.

Furthermore, the control section 301 may perform a control to carry out communication using another TTI configuration, in a UL carrier (second carrier), that provides a data section (second data section) for receiving uplink data corresponding to a UL grant transmitted in the first allocation section of the DL carrier; and provides a delivery acknowledgement section (second delivery acknowledgement section), for receiving an A/N corresponding to downlink data transmitted in a data section (first data section) of a DL carrier of a predetermined TTI after the second data section.

The control section 301 may perform a control to carry out communication using a TTI configuration, in a DL carrier (first carrier), in which a delivery acknowledgement section (first delivery acknowledgement section), for transmitting an A/N corresponding to uplink data received in a data section (second data section) of a UL carrier of a preceding (e.g., one previous) TTI, overlaps with an allocation section (first allocation section) for transmitting a DL grant (first downlink control information) and/or a UL grant (second downlink control information); and provides a data section (first data section), for transmitting downlink data corresponding to a DL grant transmitted in a first allocation section after the first delivery acknowledgement section.

Furthermore, the control section 301 may perform a control to carry out communication using another TTI configuration, in a UL carrier (second carrier), in which a delivery acknowledgement section (second delivery acknowledgement section), for receiving an A/N corresponding to downlink data transmitted in a data section (first data section) of a DL carrier of a preceding (e.g., one previous) TTI, overlaps with a first allocation section of the DL carrier; and provides a data section (second data section), for receiving uplink data corresponding to a UL grant transmitted in a first allocation section of the DL carrier after the second delivery acknowledgement section.

In the case where a TTI configuration, provided with at least one allocation section, data section and delivery acknowledgement section, is used with a plurality of carriers, the control section 301 may perform a control to carry out communication using a TTI configuration in which a length of at least one section is different between the plurality of carriers.

Furthermore, the control section 301 may perform a control to generate information in regard to a TTI configuration and notify the user terminal 20 thereof.

The transmission signal generating section 302 generates a downlink signal (a downlink control signal, a downlink data signal, or a downlink reference signal, etc.) based on instructions from the control section 301, and outputs the generated signal to the mapping section 303.

Based on common recognition in the field of the art pertaining to the present invention, the downlink control signal generating section 302 can be configured as a signal generator or a signal generating circuit.

The transmission signal generating section 302 generates, based on instructions form the control section 301, a DL assignment that notifies allocation information of a downlink signal and a UL grant that notifies allocation information of an uplink signal. Furthermore, an encoding process and a modulation process are carried out on the downlink data signal in accordance with a coding rate and modulation scheme that are determined based on channel state information (CSI), etc., that is notified from each user terminal 20.

Based on instructions from the control section 301, the mapping section 303 maps the downlink signal generated in the transmission signal generating section 302 to a predetermined radio resource(s) to output to the transmitting/receiving sections 103. Based on common recognition in the field of the art pertaining to the present invention, the mapping section 303 can be configured as a mapper, a mapping circuit and a mapping device.

The reception signal processing section 304 performs a receiving process (e.g., demapping, demodulation, and decoding, etc.) on a reception signal input from the transmitting/receiving section 103. The reception signal can be, for example, an uplink signal (uplink control signal, uplink data signal, uplink reference signal, etc.) transmitted from the user terminal 20. Based on common recognition in the field of the art pertaining to the present invention, the reception signal processing section 304 can be configured as a signal processor, a signal processing circuit, or a signal processing device.

The reception signal processing section 304 outputs information that is encoded by the reception process to the control section 301. For example, in the case where a PUCCH including an HARQ-ACK is received, the HARQ-ACK is output to the control section 301. Furthermore, the reception signal processing section 304 outputs a reception signal or a reception-processed signal to the measuring section 305.

The measuring section 305 carries out a measurement on the received signal. Based on common recognition in the field of the art pertaining to the present invention, the measuring section 305 can be configured as a measurer, a measuring circuit or a measuring device.

The measuring section 305 may measure, e.g., the reception power of the received signal (e.g., RSRP (Reference Signal Received Power)), the reception quality (e.g., RSRQ (Reference Signal Received Quality)), and the channel quality, etc. The measurement results may be output to the control section 301.

<User Terminal>

Figure 14:
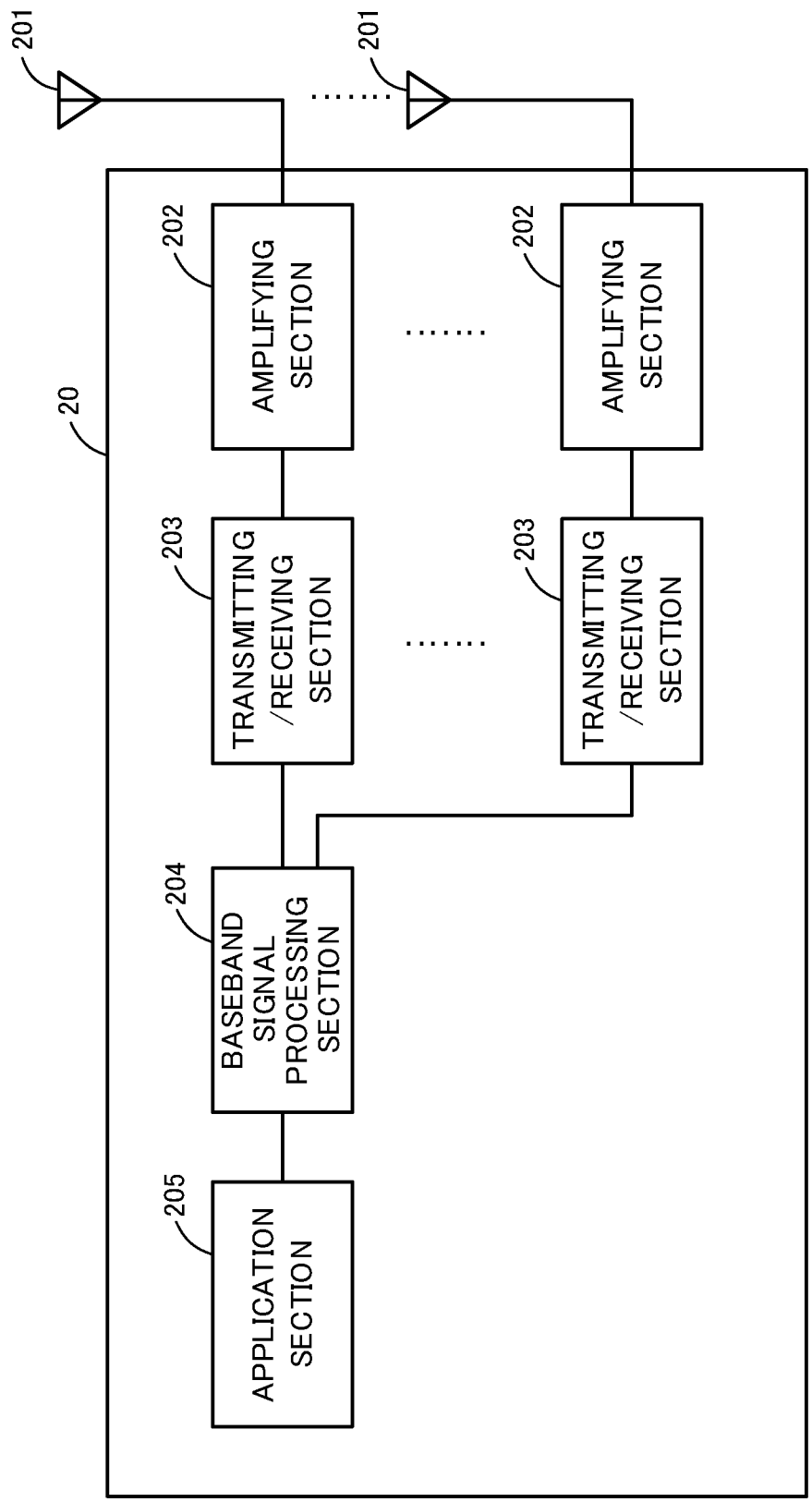
FIG. 14 is an illustrative diagram showing an overall configuration of a user terminal according to the illustrated embodiment of the present invention.

FIG. 14 is a diagram showing an illustrative example of an overall structure of a user terminal according to the present embodiment. The user terminal 20 is provided with a plurality of transmitting/receiving antennas 201, amplifying sections 202, transmitting/receiving sections 203, a baseband signal processing section 204 and an application section 205. Note that each of the transmitting/receiving antennas 201, the amplifying sections 202, and the transmitting/receiving sections 203 only need to be configured of one of more thereof, respectively.

Radio frequency signals that are received in the transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204. Based on common recognition in the field of the art pertaining to the present invention, each transmitting/receiving section 203 can be configured as a transmitter/receiver, a transmitter/receiver circuit or a transmitter/receiver device. Note that each transmitting/receiving sections 203 can be configured as an integral transmitting/receiving section, or can be configured as a transmitting section and a receiving section.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Note that the transmitting/receiving sections 203 transmit uplink data in an uplink shared channel (e.g., a PUSCH) to the radio base station 10 in the data section of the UL data TTI determined by the control section 401. The transmitting/receiving sections 203 transmit an HARQ-ACK for downlink data transmitted in a downlink shared channel (PDSCH) in a delivery acknowledgement section of a DL data TTI determined by the control section 401.

The transmitting/receiving sections 203 receive a DCI regarding transmission and/or reception of data from the radio base station 10 in an allocation section determined by the control section 401. For example, the transmitting/receiving sections 203 may receive instruction information (a DL grant) for receiving a downlink shared channel (PDSCH). Furthermore, the transmitting/receiving sections 203 may receive instruction information (a UL grant) for transmitting an uplink shared channel (PUSCH). Such DCIs may be received in the same TTI, or may be received in different TTIs. Furthermore, such DCIs may be received in the same frequency carrier, or may be received in different frequency carriers.

The transmitting/receiving sections 203 receive downlink data (PDSCH) in a data section of a DL data TTI determined by the control section 401. Furthermore, the transmitting/receiving sections 203 may receive an HARQ-ACK for uplink data (PUSCH) in a delivery acknowledgement section of a UL data TTI determined by the control section 401. Furthermore, the transmitting/receiving sections 203 may receive TTI configuration instruction information from the radio base station 10 in an allocation section determined by the control section 401.

Figure 15:
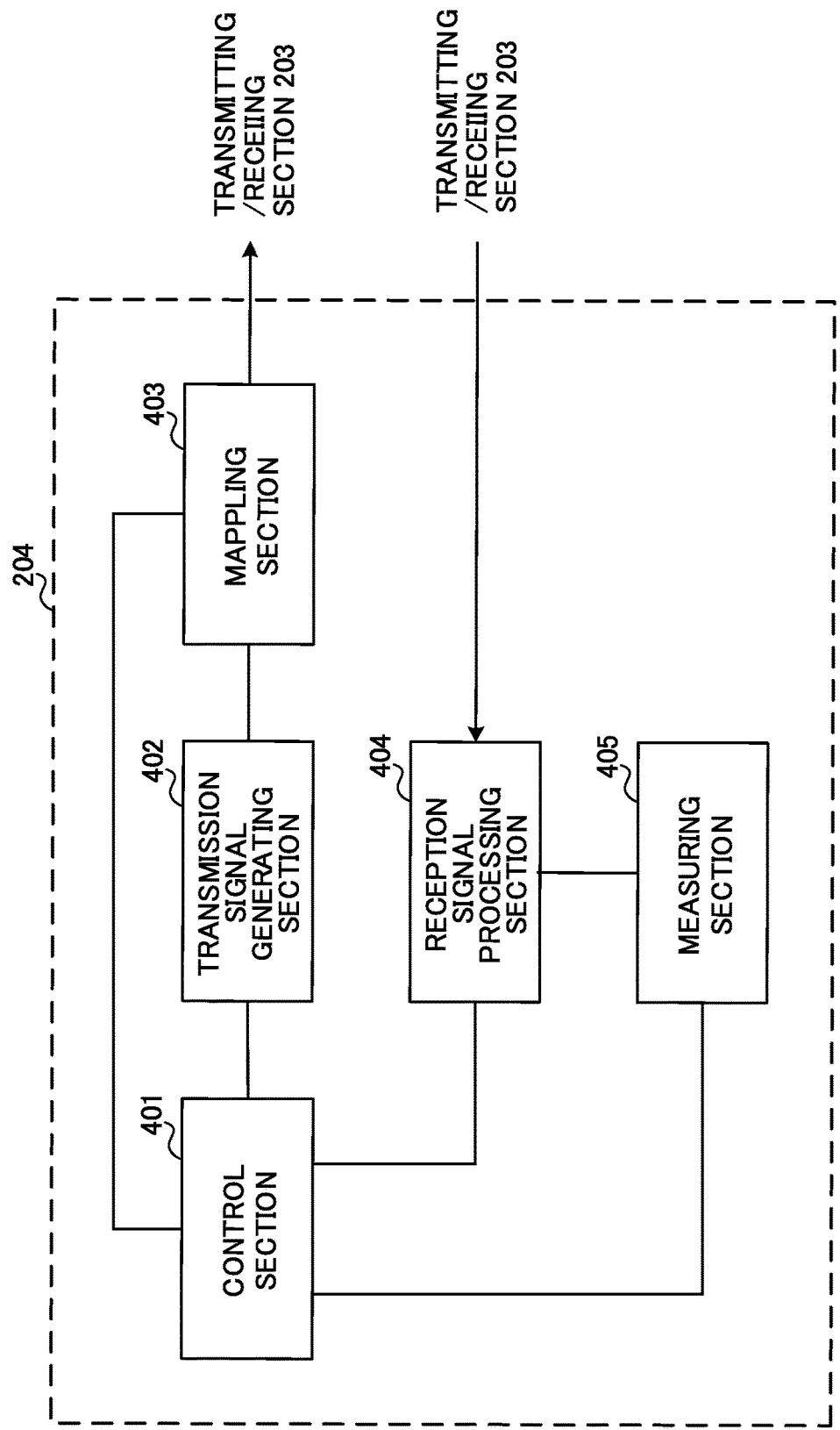
FIG. 15 is an illustrative diagram showing a functional configuration of the user terminal according to the illustrated embodiment of the present invention.

FIG. 15 is a diagram illustrating the functional configurations of the user terminal according to the present embodiment. Note that FIG. 15 mainly shows functional blocks of the features of the present embodiment; the user terminal 20 is also provided with other functional blocks that are necessary for carrying out radio communication. As illustrated in FIG. 15, the baseband signal processing section 204 provided in the user terminal 20 includes a control section 401, a transmission signal generating section 402, a mapping section 403, a reception signal processing section 404, and a measuring section 405.

The control section 401 carries out the control of the entire user terminal 20. Based on common recognition in the field of the art pertaining to the present invention, the control section 401 can be configured as a controller, a control circuit or a control device.

The control section 401 controls, e.g., the generation of signals by the transmission signal generating section 402, and the allocation of signals by the mapping section 403. Furthermore, the control section 401 controls the reception processes of signals by the reception signal processing section 404, and the measurement of signals by the measuring section 405.

The control section 401 obtains a downlink control signal (a signal transmitted on a PDCCH/EPDCCH) transmitted from the radio base station 10 and a downlink data signal (a signal transmitted on a PDSCH) from the reception signal processing section 404. The control section 401 controls the generation of an uplink control signal (e.g., a delivery acknowledgement signal, etc.) and the generation of an uplink data signal based on a determination result on whether or not a retransmission control is necessary for the downlink control signal and the downlink data signal.

The control section 401 controls the transmission and/or reception of each TTI based on a predetermined TTI configuration. Specifically, the control section 401 performs a control, in units of 1 TTI or 2 TTIs, to receive downlink control information (e.g., DCI), carry out transmission and/or reception of data corresponding to the downlink control information, and carry out transmission and/or reception of an A/N corresponding to predetermined data.

For example, the control section 401 may perform a control to carry out communication using a TTI configuration, as a DL data TTI, that provides a data section after an allocation section, for receiving a DL grant, provides a non-transmission section after the data section, and provides a delivery acknowledgement section after the non-transmission section.

Furthermore, the control section 401 may perform a control to carry out communication using a TTI configuration, as a DL data TTI, in which a data section overlaps with an allocation section, for receiving a DL grant, provides a non-transmission section after the data section, and provides a delivery acknowledgement section after the non-transmission section.

Furthermore, the control section 401 may perform a control to carry out communication using a TTI configuration, as a UL data TTI, that provides a non-transmission section after an allocation section, for receiving a UL grant, provides a data section after the non-transmission section, and provides a delivery acknowledgement section after the data section.

In the case where TTI configuration instruction information is obtained from the reception signal processing section 404 in a predetermined TTI, the control section 401 may perform a control to determine the TTI configuration in the predetermined TTI based on the instruction information, and controls the transmission process and/or reception process.

Furthermore, in the case where a plurality of carriers are set in the user terminal 20, the control section 401 may set one carrier as a downlink carrier (DL carrier), and set another carrier as an uplink carrier (UL carrier).

The control section 401 may perform a control to carry out communication using a TTI configuration, in a DL carrier (first carrier), that provides a data section (first data section) for receiving downlink data corresponding to a DL grant received in a first allocation section after an allocation section (first allocation section), for receiving a DL grant (first downlink control information) and/or a UL grant (second downlink control information); and provides a delivery acknowledgement section (first delivery acknowledgement section), for receiving an A/N corresponding to uplink data transmitted in a data section (second data section) of a UL carrier of a predetermined TTI after the first data section.

Furthermore, the control section 401 may perform a control to carry out communication using another TTI configuration, in a UL carrier (second carrier), that provides a data section (second data section) for transmitting uplink data corresponding to a UL grant received in the first allocation section of the DL carrier; and provides a delivery acknowledgement section (second delivery acknowledgement section), for transmitting an A/N corresponding to downlink data received in a data section (first data section) of a DL carrier of a predetermined TTI after the second data section.

The control section 401 may perform a control to carry out communication using a TTI configuration, in a DL carrier (first carrier), in which a delivery acknowledgement section (first delivery acknowledgement section), for receiving an A/N corresponding to uplink data transmitted in a data section (second data section) of a UL carrier of a preceding (e.g., one previous) TTI, overlaps with an allocation section (first allocation section), for receiving a DL grant (first downlink control information) and/or a UL grant (second downlink control information); and provides a data section (first data section), for receiving downlink data corresponding to a DL grant received in a first allocation section after the first delivery acknowledgement section.

Furthermore, the control section 401 may perform a control to carry out communication using another TTI configuration, in a UL carrier (second carrier), in which a delivery acknowledgement section (second delivery acknowledgement section), for transmitting an A/N corresponding to downlink data received in a data section (first data section) of a DL carrier of a preceding (e.g., one previous) TTI, overlaps with a first allocation section of the DL carrier; and provides a data section (second data section), for transmitting uplink data corresponding to a UL grant received in a first allocation section of the DL carrier after the second delivery acknowledgement section.

In the case where a TTI configuration, provided with at least one allocation section, data section and delivery acknowledgement section, is used with a plurality of carriers, the control section 401 may perform a control to carry out communication using a TTI configuration in which a length of at least one section is different between the plurality of carriers.

Furthermore, in the case where the control section 401 obtains information regarding a TTI configuration from the reception signal processing section 404, the control section 401 may renew the parameters used in the control based on such information.

Furthermore, the transmission signal generating section 402 generates an uplink data signal (an uplink control signal, an uplink data signal, and an uplink reference signal, etc.) based on instructions from the control section 401, and outputs the uplink data signal to the mapping section 403. Based on common recognition in the field of the art pertaining to the present invention, the transmission signal generating section 402 can correspond to a signal generator, a signal generating circuit, or a signal generating device.

For example, the transmission signal generating section 402 generates an uplink control signal of a delivery acknowledgement signal or channel state information (CSI), etc., based on instructions from the control section 401. Furthermore, the transmission signal generating section 402 generates an uplink data signal based on instructions from the control section 401. For example, in the case where a UL grant is included in a downlink control signal notified by the radio base station 10, the transmission signal generating section 402 is instructed by the control section 401 to generate an uplink data signal.

The mapping section 403 maps the uplink signal generated by the transmission signal generating section 402, based on instructions from the control section 401, to radio resources and outputs the generated signal to the transmitting/receiving sections 203. Based on common recognition in the field of the art pertaining to the present invention, the mapping section 403 can be configured as a mapper, a mapping circuit or a mapping device.

The reception signal processing section 404 performs reception processing (e.g., demapping, demodulation, decoding, etc.) on the reception signal input from the transmitting/receiving sections 203. The reception signal can be, for example, a downlink signal transmitted from the radio base station 10 (downlink control signal, downlink data signal, downlink reference signal, etc.). Based on common recognition in the field of the art pertaining to the present invention, the reception signal processing section 404 can correspond to a signal processor, a signal processing circuit, or a signal processing device; or a measurer, a measuring circuit or a measuring device. Furthermore, the reception signal processing section 404 can be configured as a receiving section pertaining to the present invention.

The reception signal processing section 404 blind decodes a DCI (DCI format) which is used to schedule transmission and/or reception of data (TB: Transport Block) of a predetermined TTI based on instructions from the control section 401. For example, the reception signal processing section 404 may carry out a demasking process on the DCI using a predetermined identifier (RNTI: Radio Network Temporary Identifier) to decode the DCI, or may assume a predetermined payload size to decode the DCI.

The reception signal processing section 404 outputs information that is decoded by a reception process to the control section 401. The reception signal processing section 404 outputs, e.g., broadcast information, system information, RRC signaling, and the DCI(s) to the control section 401. Furthermore, the reception signal processing section 404 outputs reception signals, and signals subjected to reception processing to the measuring section 405.

The measuring section 405 carries out a measurement on the received signals. Based on common recognition in the field of the art pertaining to the present invention, the measuring section 405 can be configured as a measurer, a measuring circuit or a measuring device.

The measuring section 405 may measure, e.g., the reception power of the received signal (e.g., RSRP), the reception quality (e.g., RSRQ), and the channel quality, etc. The measurement results may be output to the control section 401.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio communication system and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads a programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example channel and/or symbol may be signals (signaling). Furthermore, a signal may be a message. Furthermore, component carrier (CC) may be called a frequency carrier, a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), LTE-B (LTE-Beyond), SUPER 3G, IMT-Advanced, 4G ($4^{th}$ Generation Mobile Communication System), 5G ($5^{th}$ Generation Mobile Communication System), FRA (Future Radio Access), New-RAT (Radio Access Technology), CDMA2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-Wide-Band), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long no contradictions occur. For example, each method described in the present specification proposes an example of an order of various steps but are not limited to the specified order thereof.

Hereinabove, the present invention has been described in detail by use of the foregoing embodiments. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The present application is based on the disclosure of Japanese Patent Application No. 2015-171451, filed on Aug. 31, 2015, the content of which being incorporated herein by reference in its entirety.

The invention claimed is:

1. A terminal comprising:
a receiver that receives information about a configuration of a downlink time section and an uplink time section in a time section in one subframe, the information indicating a length of the downlink time section and a length of the uplink time section, the length of the downlink time section being shorter than a length of the time section, the length of the uplink time section being shorter than the length of the time section; and
a processor that controls reception in the downlink time section in the time section and transmission in the uplink time section in the time section based on the information,
wherein
if a time division duplex is applied, then the processor controls reception in the downlink time section in a specified frequency band and transmission in the uplink time section in the specified frequency band based on the information, and
if a frequency division duplex is applied, then the processor controls reception in the downlink time section in a downlink frequency band and transmission in the uplink time section in an uplink frequency band based on the information.

2. The terminal according to claim 1, wherein the processor controls the reception in the downlink time section in the time section and the transmission in the uplink time section in the time section based on the information, irrespective of whether a time division duplex is applied or a frequency division duplex is applied.

3. The terminal according to claim 2, wherein the information indicates one of a plurality of candidates of the configuration.

4. The terminal according to claim 1, wherein the information indicates one of a plurality of candidates of the configuration.

5. The terminal according to claim 1, wherein the receiver receives the information by higher layer signaling.

6. The terminal according to claim 1, wherein the receiver receives the information by downlink control information.

7. The terminal according to claim 1, wherein a length of the time section is equal to or less than one millisecond.

8. A radio communication method for a terminal, comprising:
receiving information about a configuration of a downlink time section and an uplink time section in a time section of one subframe, the information indicating a length of the downlink time section and a length of the uplink time section, the length of the downlink time section being shorter than a length of the time section, the length of the uplink time section being shorter than the length of the time section; and
controlling reception in the downlink time section in the time section and transmission in the uplink time section in the time section based on the information,
wherein
if a time division duplex is applied, then the terminal controls reception in the downlink time section in a specified frequency band and transmission in the uplink time section in the specified frequency band based on the information, and
if a frequency division duplex is applied, then the terminal controls reception in the downlink time section in a downlink frequency band and transmission in the uplink time section in an uplink frequency band based on the information.

* * * * *